(12) United States Patent
Jagannathan et al.

(10) Patent No.: US 6,595,630 B2
(45) Date of Patent: Jul. 22, 2003

(54) METHOD AND APPARATUS FOR CONTROLLING DEPTH OF DEPOSITION OF A SOLVENT FREE FUNCTIONAL MATERIAL IN A RECEIVER

(75) Inventors: Ramesh Jagannathan, Rochester, NY (US); Glen C. Irvin, Jr., Rochester, NY (US); Seshadri Jagannathan, Pittsford, NY (US); Sridhar Sadasivan, Rochester, NY (US); Suresh Sunderrajan, Rochester, NY (US); John E. Rueping, Spencerport, NY (US); Gary E. Merz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/903,883

(22) Filed: Jul. 12, 2001

(65) Prior Publication Data

US 2003/0030706 A1 Feb. 13, 2003

(51) Int. Cl.[7] .................................................. B41J 2/175
(52) U.S. Cl. ........................................................ 347/85
(58) Field of Search ............................. 347/85, 84, 21, 347/100, 101, 105; 428/195

(56) References Cited

U.S. PATENT DOCUMENTS

| | | | | |
|---|---|---|---|---|
| 5,444,472 A | * | 8/1995 | Due et al. ..................... 347/85 |
| 5,682,191 A | * | 10/1997 | Barrett et al. ................ 347/104 |
| 6,099,113 A | * | 8/2000 | Blouin et al. .................. 347/85 |
| 6,116,718 A | | 9/2000 | Peeters et al. ................. 347/21 |
| 6,261,347 B1 | * | 7/2001 | Moreland ................ 106/31.02 |
| 6,290,342 B1 | * | 9/2001 | Vo et al. ....................... 347/85 |
| 6,328,409 B1 | * | 12/2001 | Peeters et al. ................. 347/21 |
| 6,340,216 B1 | * | 1/2002 | Peeters et al. ................. 347/21 |
| 6,471,327 B2 | * | 10/2002 | Jagannathan et al. ......... 347/21 |

FOREIGN PATENT DOCUMENTS

WO     WO 02/45868 A2     6/2002

* cited by examiner

Primary Examiner—Michael Nghiem
(74) Attorney, Agent, or Firm—William R. Zimmerli

(57) ABSTRACT

A method and apparatus for delivering a functional material to a receiver includes a pressurized source of solvent in a thermodynamically stable mixture with a functional material. The solvent is in a liquid state within the pressurized source. A discharge device having an inlet and an outlet is connected to the pressurized source at the inlet such that the thermodynamically stable mixture is ejected from the outlet. A receiver having a back is positioned a predetermined distance from the outlet of the discharge device. The solvent of the thermodynamically mixture evaporates at a location beyond the outlet of the discharge device and a predetermined amount of the functional material contacts the receiver at a predetermined distance from the back of the receiver.

55 Claims, 19 Drawing Sheets

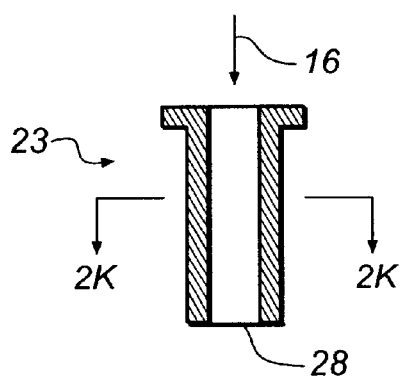
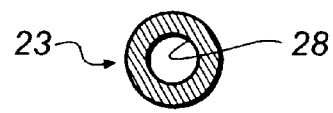
FIG. 2B  FIG. 2K
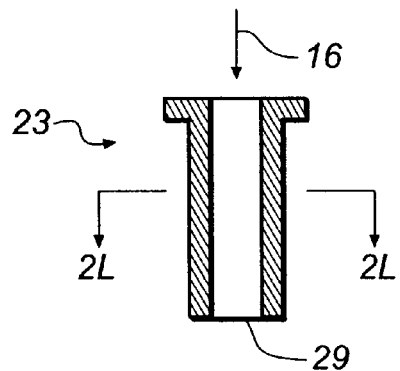
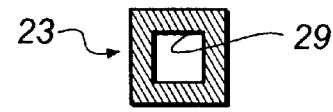
FIG. 2C  FIG. 2L
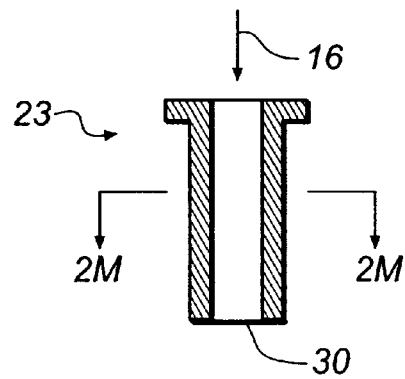
FIG. 2D  FIG. 2M

⊢10 MICRONS⊣

|—10 MICRONS—|

METHOD AND APPARATUS FOR CONTROLLING DEPTH OF DEPOSITION OF A SOLVENT FREE FUNCTIONAL MATERIAL IN A RECEIVER

CROSS REFERENCE TO RELATED APPLICATIONS

Reference is made to commonly assigned, pending U.S. Ser. No. 09/794,671, now U.S. Pat. No. 6,471,327 entitled Apparatus And Method Of Delivering A Focused Beam of A Thermodynamically Stable/Metastable Mixture Of A Functional Material In A Dense Fluid Onto A Receiver, filed in the name of Ramesh Jagannathan et al., on Feb. 27, 2001.

FIELD OF THE INVENTION

This invention relates generally to deposition technologies and, more particularly, to a technology for controlling the depth of deposition of a solvent free functional material in a receiver.

BACKGROUND OF THE INVENTION

In a typical ink jet recording or printing system, ink droplets are ejected from a nozzle towards a receiver (recording medium, recording element, etc.) to produce an image on the receiver. The ink droplets, or recording liquid, generally comprise a marking material or functional material, such as a dye or pigment or polymer, and a large amount of solvent. The solvent, or carrier liquid, typically is made up of water, an organic material such as a monohydric alcohol, a polyhydric alcohol, or mixtures thereof. The liquid ink droplets are ejected from the nozzle using pressure pulses generated by an oscillating piezoelectric crystal or by heating the nozzle to generate an ink droplet resulting from bubble formation or from ink phase change. Alternatively, the liquid ink droplets can be ejected in a continuous manner with selected ink droplets being allowed to impinge on a receiver while other ink droplets are collected in a gutter.

A receiver typically comprises a support having on at least one surface thereof an ink-receiving or image-forming layer. In order to achieve high quality, high resolution images on the receiver, the receiver should be readily wetted so there is no coalescence of adjacent ink dots (commonly referred to as puddling) which can lead to non-uniform ink droplet density. The receiver should also exhibit no image bleeding; exhibit the ability to absorb high concentrations of ink droplets and dry quickly to avoid elements blocking together when stacked against subsequent prints or other surfaces; and exhibit no discontinuities or defects due to interactions between the support and/or layer(s) (e.g cracking, repellencies, comb lines, etc.). Additionally, the receiver should not allow unabsorbed dyes to aggregate at the free surface of the receiver causing dye crystallization, which results in bloom or bronzing effects in the imaged areas.

The requirements listed above are all affected by the ability of the receiver to manage the solvent fluid volume efficiently and in a manner as to prevent image degradation arising from persistent solvent effects. Such fluid management issues, in turn, place strong demands on the receiver, requiring complex receiver designs and correspondingly complex and expensive manufacturing options.

Referring to FIGS. 7A and 7B, a conventional inkjet print using conventional inkjet inks and a conventional inkjet printer imaged on conventional photographic inkjet paper is shown The receiver 14 includes a paper base 92 coated with two ink receiving layers, a base layer 94, and a top layer 96. Ink 98 (a mixture dye and solvent) is retained in the top layer 96 by a mordant. However, the solvent diffuses into the receiver 14 carrying with it the dye which causes bleeding of the ink 98 into the base layer 94. This makes the accurate deposition of dye or another functional material in the receiver 14 very difficult.

The requirements listed above become less critical in situations where the ink solvent diffuses through or away from the receiver element at time-scales many orders of magnitude higher than that of the dyes or pigments. This can be achieved by dispersing the dye particles in a highly volatile liquid medium, for example, highly volatile organic solvents such as acetone, or in a gaseous medium, such as an aerosol. However, volatile organic solvents, like the ones described above, are not preferred because of safety and health issues that accompany the use of these solvents. Typically, these solvents are highly flammable and are also known carcinogens. As such, appropriate safety measures are needed when they are used which increases associated costs and severely limits their usefulness.

Technologies that deposit a marking material such as a toner particle onto a receiver using gaseous propellants are known. For example, Peeters et al., in U.S. Pat. No. 6,116,718, disclose a print head for use in a marking apparatus in which a propellant gas is passed through a channel, the functional material is introduced controllably into the propellant stream to form a ballistic aerosol for propelling non-colloidal, solid or semi-solid particulate or a liquid, toward a receiver with sufficient kinetic energy to fuse the marking material to the receiver. There is a problem with this technology in that the functional material and propellant stream are two different entities and the propellant is used to impart kinetic energy to the functional material. This can cause functional material agglomeration leading to nozzle obstruction and poor control over functional material deposition. Another problem with this technology is that when the functional material is added into the propellant stream in the channel it forms a non-colloidal ballistic aerosol prior to exiting the print head. This non-colloidal ballistic aerosol, which is a combination of the functional material and the propellant, is not thermodynamically stable. As such, the functional material is prone to settling in the propellant stream which, in turn, can cause functional material agglomeration leading to nozzle obstruction and poor control over functional material deposition.

As such, there is a need for a technology that permits high speed, accurate, and precise deposition of a solvent free functional material on a receiver. Additionally, there is a need for a technology capable of controlled functional material deposition within a receiver or within a predetermined layer of a receiver. There is also a need for a technology that permits functional material deposition of ultra-small (nano-scale) particles. There is also a need for a technology that permits high speed, accurate, and precise patterning of a receiver that can be used to create a high resolution patterns on a receiver.

There is also a need to develop suitable receivers that, when used in conjunction with the technology described above, assist in the accurate deposition of the functional material without being adversely impacted by the functional material. There is also a need to develop suitable receivers that permit the accurate positioning of the functional material on the receiver or within the receiver (e.g. within a predetermined layer of the receiver, a predetermined distance from the receiver surface, etc.). Additionally, there is a need to develop receivers that meet other requirements critical for broad consumer acceptance (e.g. receiver properties such as basis weight, caliper, stiffness, smoothness, gloss, whiteness, opacity, etc.) in addition to being suitable for use with the technology described above.

SUMMARY OF THE INVENTION

An object of the present invention is to provide a technology that permits high speed, accurate, and precise deposition of a solvent free functional material on a receiver.

Another object of the present invention is to provide a technology capable of controlled functional material deposition within a receiver or within a predetermined layer of a receiver.

Another object of the present invention is to provide a technology that permits high speed, accurate, and precise patterning of a receiver that can be used to create a high resolution patterns on a receiver.

Another object of the present invention is to provide receivers that assist in the accurate deposition of the functional material without being adversely impacted by the functional material.

Another object of the present invention is to provide receivers that permit the accurate positioning of the functional material on the receiver or within the receiver.

According to a feature of the present invention, a method of delivering a functional material to a receiver includes in order, providing a mixture of a fluid having a solvent and a functional material; causing the functional material to become free of the solvent, and causing the functional material to contact a receiver.

According to another feature of the present invention, an apparatus for delivering a functional material to a receiver includes a pressurized source of solvent in a thermodynamically stable mixture with a functional material, the solvent being in a liquid state within the pressurized source. A discharge device having an inlet and an outlet, the discharge device being connected to the pressurized source at the inlet, the thermodynamically stable mixture being ejected from the outlet, the solvent being in a gaseous state at a location beyond the outlet of the discharge device. A media conveyance mechanism positioned a predetermined distance from the outlet of the discharge device.

According to another feature of the present invention, a method of delivering a functional material to a receiver includes providing a source of a thermodynamically stable mixture of a solvent in a liquid state and a functional material; providing a discharge device having a nozzle in fluid communication with the source of the thermodynamically stable mixture; positioning a receiver at a predetermined distance from the nozzle, ejecting the thermodynamically stable mixture from the nozzle, the solvent changing from the liquid state to a gaseous state; and depositing the solvent free functional material on the receiver.

BRIEF DESCRIPTION OF THE DRAWINGS

In the detailed description of the preferred embodiments of the invention presented below, reference is made to the accompanying drawings, in which:

FIGS. 2B–2M are cross sectional views of a nozzle portion of the device show in FIG. 2A;

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art. Additionally, materials identified as suitable for various facets of the invention, for example, functional materials, solvents, equipment, etc. are to be treated as exemplary, and are not intended to limit the scope of the invention in any manner.

Figure 1A:
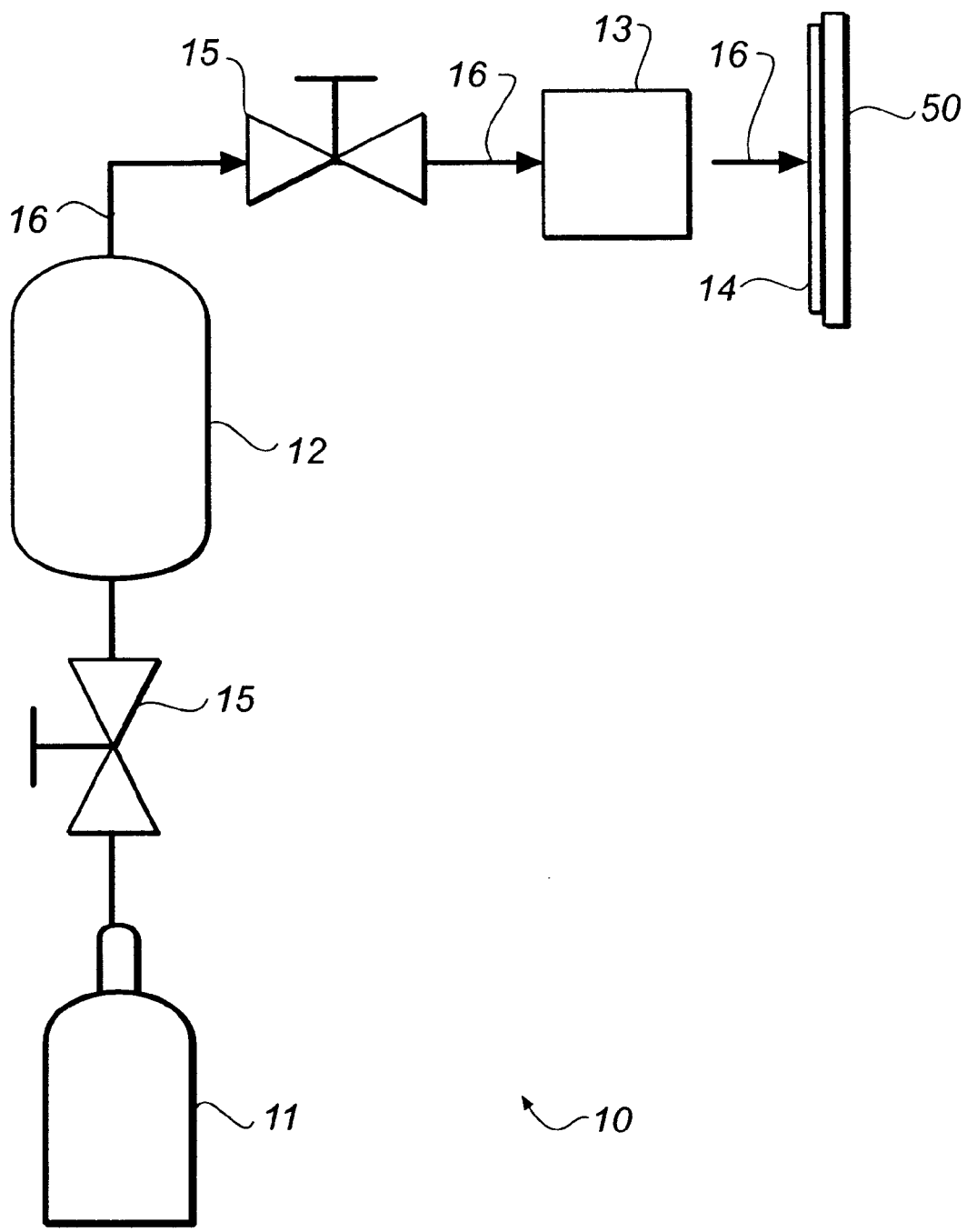
FIG. 1A is a schematic view of a preferred embodiment made in accordance with the present invention.

Referring to FIG. 1A, delivery system 10 has components, 11, 12, and 13 that take chosen solvent and/or dispersant materials to a compressed liquid and/or supercritical fluid state, make a solution and/or dispersion of an appropriate functional material or combination of functional materials in the chosen compressed liquid and/or supercritical fluid, and deliver the functional materials as a collimated and/or focused beam onto a receiver 14 in a controlled manner. Functional materials can be any material that needs to be delivered to a receiver, for example electroluminescent materials, imaging dyes, ceramic nanoparticles etc., to create a pattern on the receiver by deposition, etching, coating, other processes involving the placement of a functional material on a receiver, etc.

In this context, the chosen materials taken to a compressed liquid and/or supercritical fluid state are gases at ambient pressure and temperature. Ambient conditions are preferably defined as temperature in the range from –100 to +100° C., and pressure in the range from $1 \times 10^{-8}$ – 100 atm for this application.

In FIG. 1A, a schematic illustration of the delivery system 10 is shown. The delivery system 10 has a compressed liquid/supercritical fluid source 11, a formulation reservoir 12, and a discharge device 13 connected in fluid communication along a delivery path 16. The delivery system 10 can also include a valve or valves 15 positioned along the delivery path 16 in order to control flow of the compressed liquid/supercritical fluid.

A compressed liquid/supercritical fluid carrier, contained in the compressed liquid/supercritical fluid source 1, is any material that dissolves/solubilizes/disperses a functional material. The compressed liquid/supercritical fluid source 11 delivers the compressed liquid/supercritical fluid carrier at predetermined conditions of pressure, temperature, and flow rate as a supercritical fluid, or a compressed liquid. Materials that are above their critical point, defined by a critical temperature and a critical pressure, are known as supercritical fluids. The critical temperature and critical pressure typically define a thermodynamic state in which a fluid or a material becomes supercritical and exhibits gas like and liquid like properties. Materials that are at sufficiently high temperatures and pressures below their critical point are known as compressed liquids. Materials in their supercritical fluid and/or compressed liquid state that exist as gases at ambient conditions find application here because of their unique ability to solubilize and/or disperse functional materials of interest in the compressed liquid or supercritical state.

Fluid carriers include, but are not limited to, carbon dioxide, nitrous oxide, ammonia, xenon, ethane, ethylene, propane, propylene, butane, isobutane, chlorotrifluoromethane, monofluoromethane, sulphur hexafluoride and mixtures thereof. Due its characteristics, e g. low cost, wide availability, etc., carbon dioxide is generally preferred in many applications.

The formulation reservoir 12 is utilized to dissolve and/or disperse functional materials in compressed liquids or supercritical fluids with or without dispersants and/or surfactants, at desired formulation conditions of temperature, pressure, volume, and concentration. The combination of functional material and compressed liquid/supercritical fluid is typically referred to as a mixture, formulation, etc.

The formulation reservoir 12 can be made out of any suitable materials that can safely operate at the formulation conditions An operating range from 0.001 atmosphere ($1.013 \times 10^2$ Pa) to 1000 atmospheres ($1.013 \times 10^8$ Pa) in pressure and from −25 degrees Centigrade to 1000 degrees Centigrade is generally preferred. Typically, the preferred materials include various grades of high pressure stainless steel. However, it is possible to use other materials if the specific deposition or etching application dictates less extreme conditions of temperature and/or pressure.

The formulation reservoir 12 should be precisely controlled with respect to the operating conditions (pressure, temperature, and volume). The solubility/dispersibility of functional materials depends upon the conditions within the formulation reservoir 12. As such, small changes in the operating conditions within the formulation reservoir 12 can have undesired effects on functional material solubility/dispensability.

Additionally, any suitable surfactant and/or dispersant material that is capable of solubilizing/dispersing the functional materials in the compressed liquid/supercritical fluid for a specific application can be incorporated into the mixture of functional material and compressed liquid/supercritical fluid. Such materials include, but are not limited to, fluorinated polymers such as perfluoropolyether, siloxane compounds, etc.

The receiver 14 can be positioned on a media conveyance mechanism 50 that is used to control the movement of the receiver during the operation of the delivery system 10. The media conveyance mechanism 50 can be a drum, an x, y, z translator, any other known media conveyance mechanism, etc.

Figure 1B:
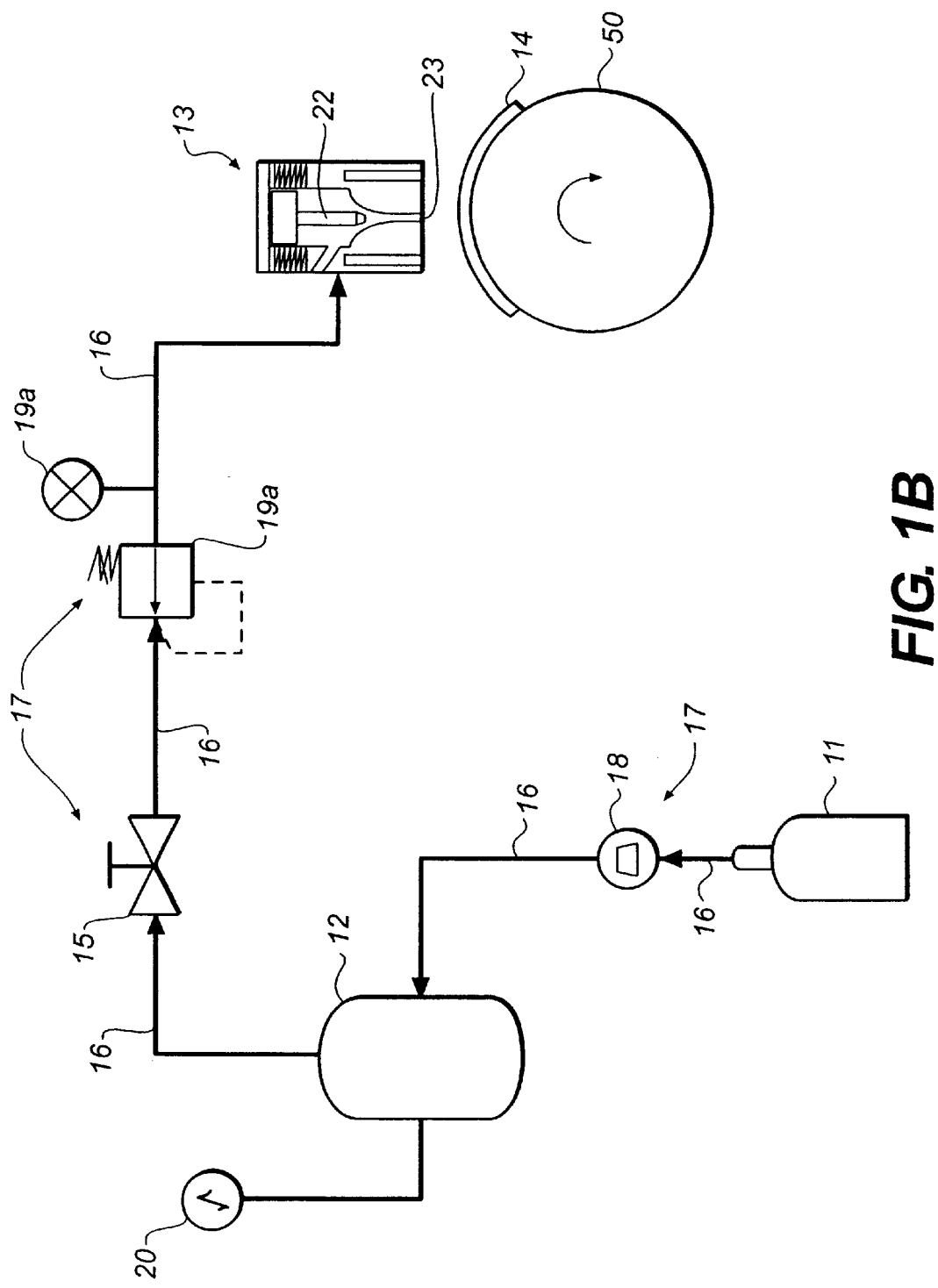
FIGS. 1B–1G are schematic views of alternative embodiments made in accordance with the present invention.
Figure 1C:
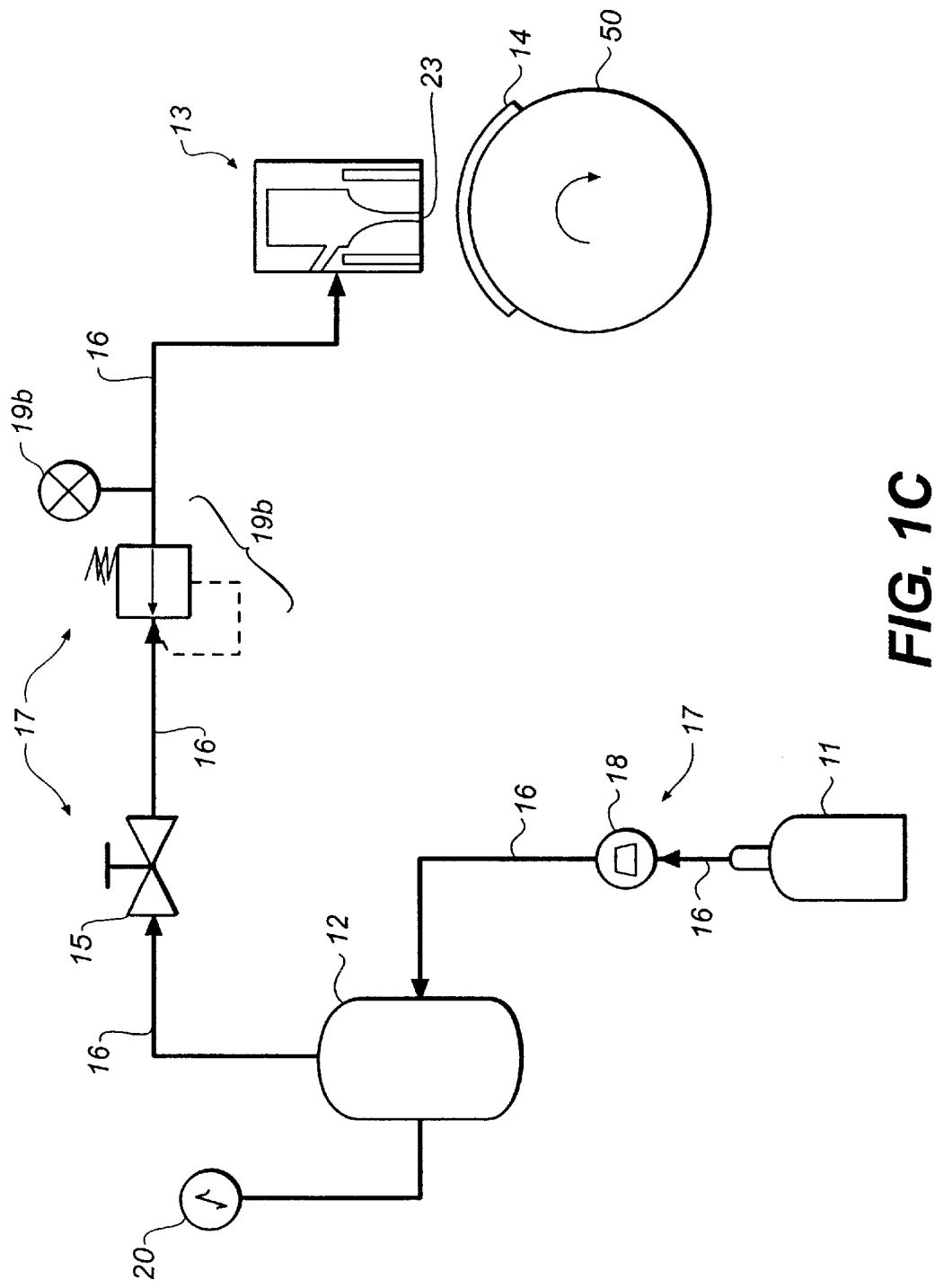
Figure 1D:
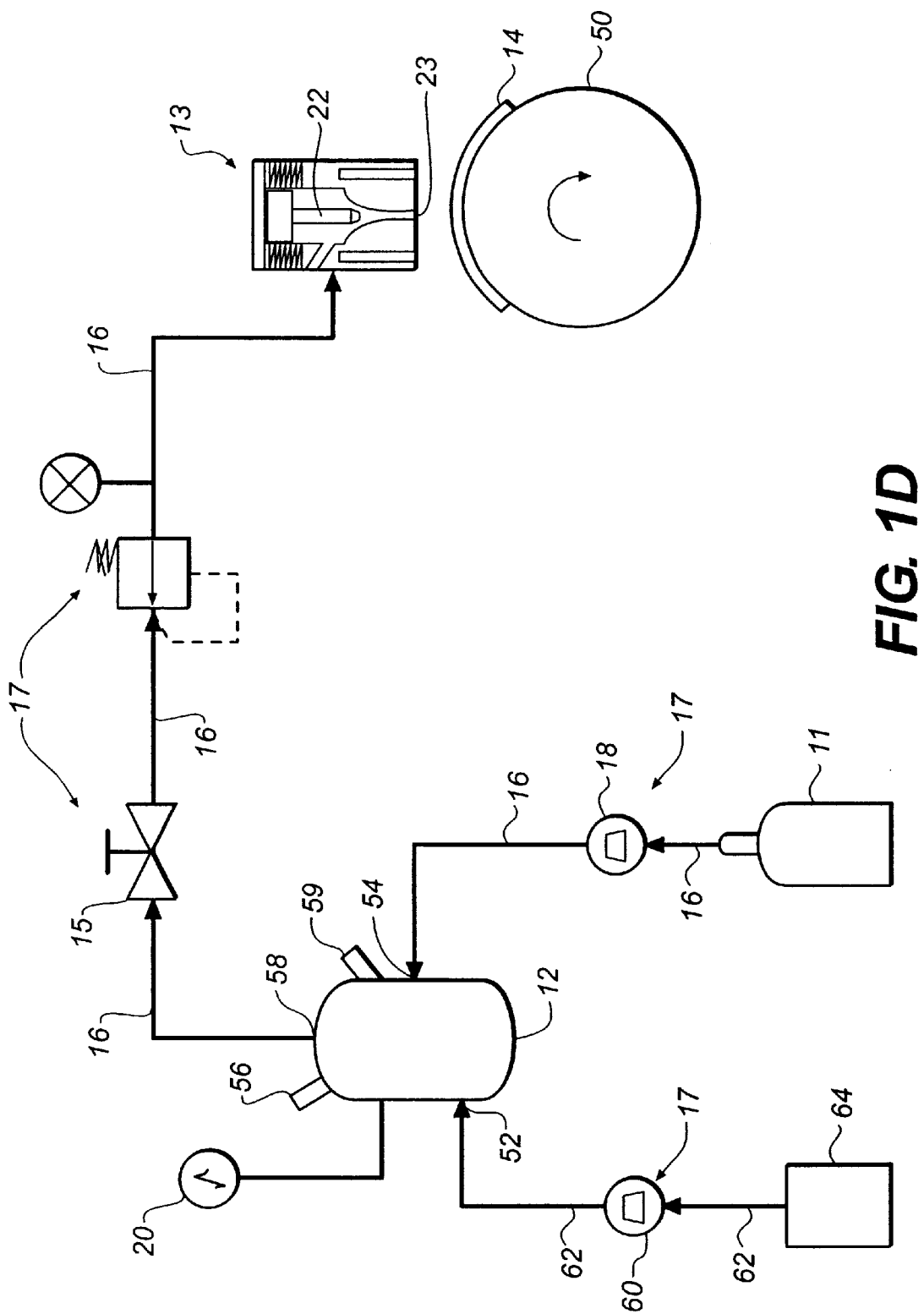

Referring to FIGS. 1B–1D, alternative embodiments of the invention shown in FIG. 1A are described. In each of these embodiments, individual components are in fluid communication, as is appropriate, along the delivery path 16.

Referring to FIGS. 1B and 1C, a pressure control mechanism 17 is positioned along the delivery path 16. The pressure control mechanism 17 is used to create and maintain a desired pressure required for a particular application. The pressure control mechanism 17 can include a pump 18, a valve(s) 15, and a pressure regulator 19a, as shown in FIG. 1B. Alternatively, the pressure control mechanism 17 can include a pump 18, a valve(s) 15, and a multi-stage pressure regulator 19b, as shown in FIG. 1C. Additionally, the pressure control mechanism 17 can include alternative combinations of pressure controlling devices, etc. For example, the pressure control mechanism 17 can include additional valve(s) 15, actuators to regulate fluid/formulation flow, variable volume devices to change system operating pressure, etc., appropriately positioned along the delivery path 16. Typically, the pump 18 is positioned along the delivery path 16 between the fluid source 11 and the formulation reservoir 12. The pump 18 can be a high pressure pump that increases and maintains system operating pressure, etc. The pressure control mechanism 17 can also include any number of monitoring devices, gauges, etc., for monitoring the pressure of the delivery system 10.

A temperature control mechanism 20 is positioned along delivery path 16 in order to create and maintain a desired temperature for a particular application The temperature control mechanism 20 is preferably positioned at the formulation reservoir 12. The temperature control mechanism 20 can include a heater, a heater including electrical wires, a water jacket, a refrigeration coil, a combination of temperature controlling devices, etc. The temperature control mechanism 20 can also include any number of monitoring devices, gauges, etc., for monitoring the temperature of the delivery system 10.

The discharge device 13 includes a nozzle 23 positioned to provide directed delivery of the formulation towards the receiver 14. The discharge device 13 can also include a shutter 22 to regulate the flow of the supercritical fluid/compressed liquid and functional material mixture or formulation. The shutter 22 regulates flow of the formulation in a predetermined manner (i.e. on/off or partial opening operation at desired frequency, etc.). The shutter 22 can be manually, mechanically, pneumatically, electrically or electronically actuated. Alternatively, the discharge device 13 does not have to include the shutter 22 (shown in FIG. 1C). As the mixture is under higher pressure, as compared to ambient conditions, in the delivery system 10, the mixture will naturally move toward the region of lower pressure, the area of ambient conditions. In this sense, the delivery system 10 is said to be self-energized.

The receiver 14 can be positioned on a media conveyance mechanism 50 that is used to control the movement of the receiver during the operation of the delivery system 10. The media conveyance mechanism 50 can be a drum, an x, y, z translator, any other known media conveyance mechanism, etc.

Referring to FIG. 1D, the formulation reservoir 12 can be a pressurized vessel having appropriate inlet ports 52, 54, 56 and outlet ports 58. Inlet ports 52, 54, 56 can be used as an inlet for functional material 52 and an inlet for compressed liquid or supercritical fluid 54. Alternatively, inlet port 56 can be used to manually add functional material to the formulation reservoir 12. Outlet port 58 can be used as an outlet for the mixture of functional material and compressed/supercritical fluid.

When automated delivery of the functional material is desired, a pump 60 is positioned along a functional material delivery path 62 between a source of functional material 64 and the formulation reservoir 12. The pump 60 pumps a desired amount of functional material through inlet port 52 into the formulation reservoir 12. The formulation reservoir 12 can also include additional inlet/outlet ports 59 for inserting or removing small quantities of functional material or functional material and compressed liquid/supercritical fluid mixtures.

Figure 1E:
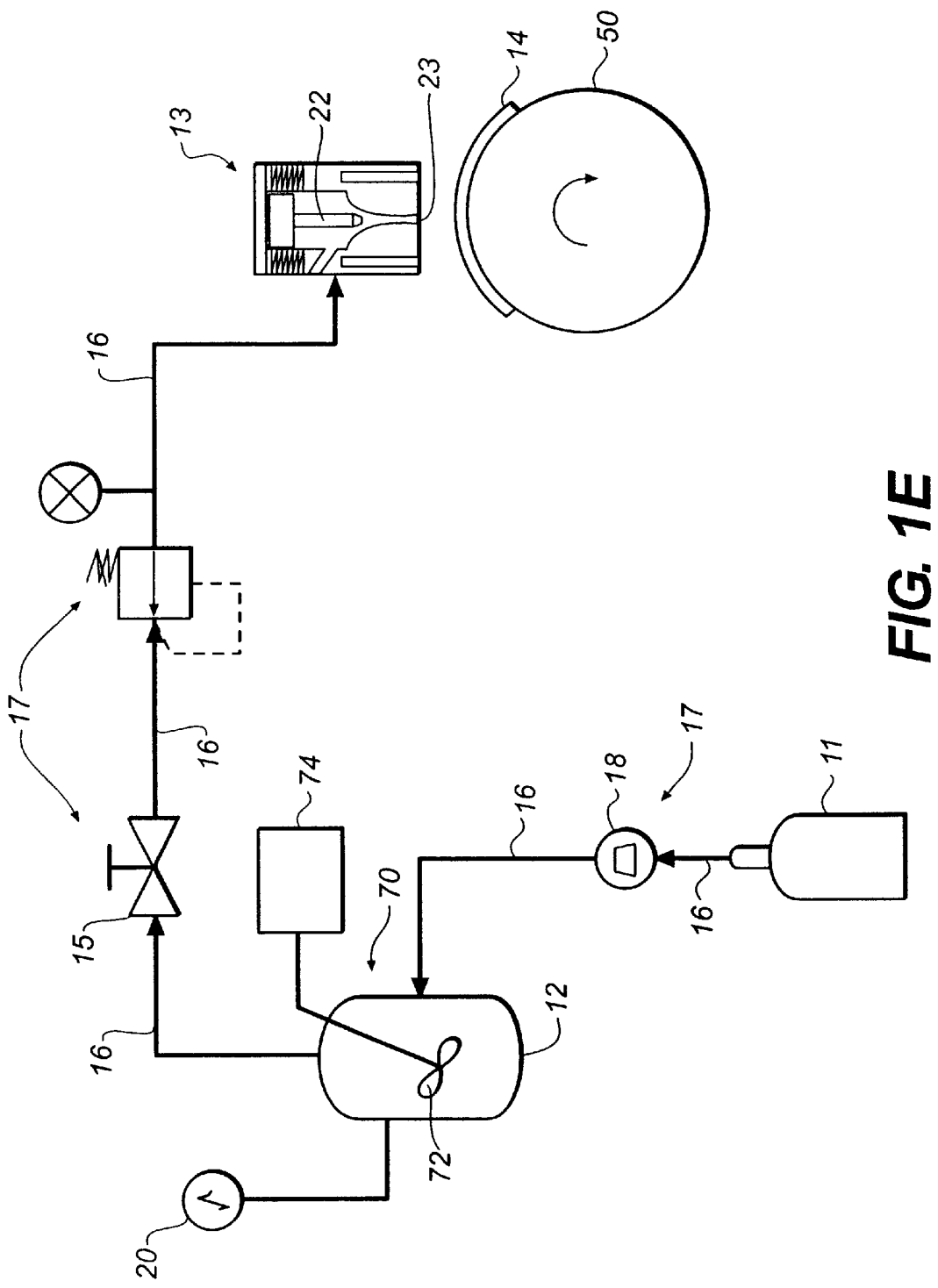

Referring to FIG. 1E, the formulation reservoir 12 can include a mixing device 70 used to create the mixture of functional material and compressed liquid/supercritical fluid. Although typical, a mixing device 70 is not always necessary to make the mixture of the functional material and compressed/supercritical fluid depending on the type of functional material and the type of compressed liquid/supercritical fluid. The mixing device 70 can include a mixing element 72 connected to a power/control source 74 to ensure that the functional material disperses into or forms a solution with the compressed liquid or supercritical fluid. The mixing element 72 can be an acoustic, a mechanical, and/or an electromagnetic element.

Referring to FIGS. 1D, 1E, and FIGS. 4A–4J, the formulation reservoir 12 can also include suitable temperature control mechanisms 20 and pressure control mechanisms 17 with adequate gauging instruments to detect and monitor the temperature and pressure conditions within the reservoir, as described above. For example, the formulation reservoir 12 can include a moveable piston device 76, etc., to control and maintain pressure. The formulation reservoir 12 can also be equipped to provide accurate control over temperature within the reservoir. For example, the formulation reservoir 12 can include electrical heating/cooling zones 78, using electrical wires 80, electrical tapes, water jackets 82, other heating/cooling fluid jackets, refrigeration coils 84, etc., to control and maintain temperature. The temperature control mechanisms 20 can be positioned within the formulation reservoir 12 or positioned outside the formulation reservoir. Additionally, the temperature control mechanisms 20 can be positioned over a portion of the formulation reservoir 12, throughout the formulation reservoir 12, or over the entire area of the formulation reservoir 12.

Figure 4A:
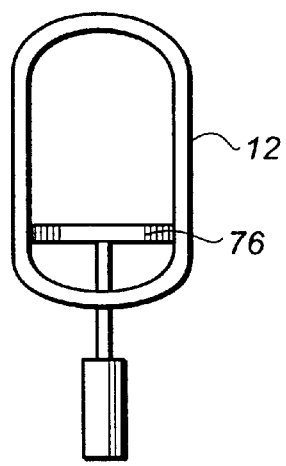
FIGS. 4A–4K are cross sectional views of a portion of the invention shown in FIG. 1A.
Figure 4B:
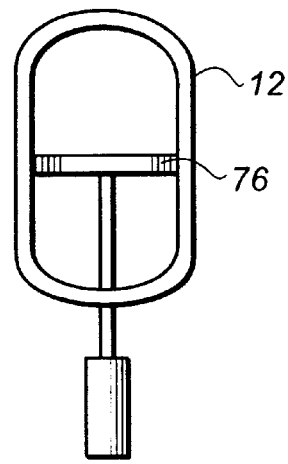
Figure 4C:
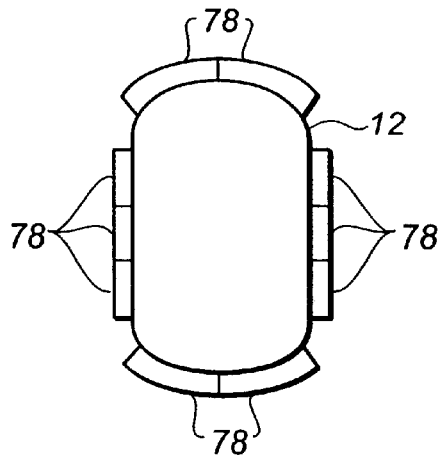
Figure 4D:
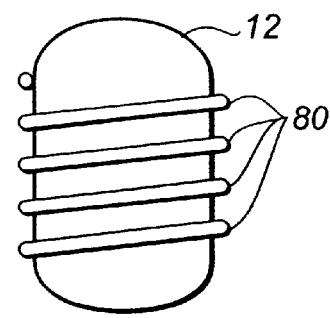
Figure 4E:
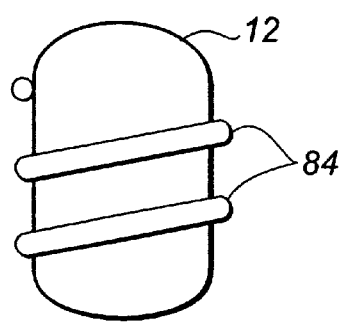
Figure 4F:
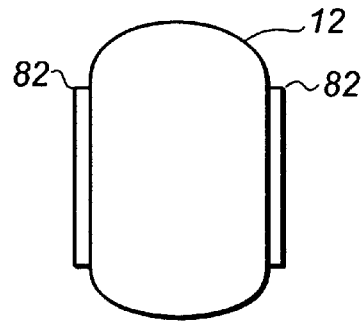
Figure 4G:
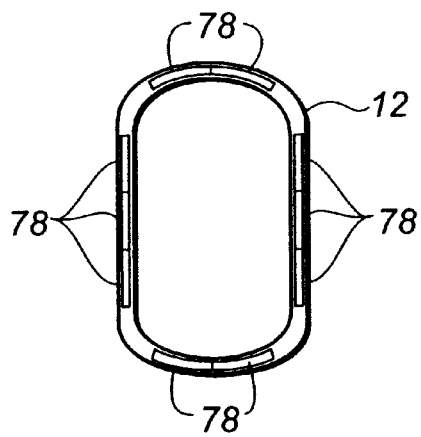
Figure 4H:
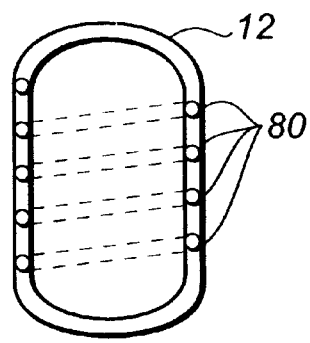
Figure 4I:
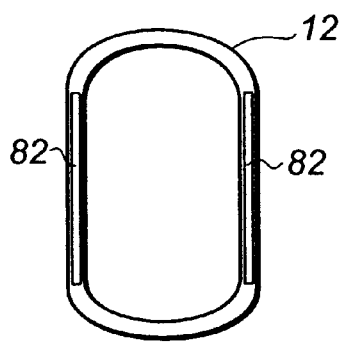
Figure 4J:
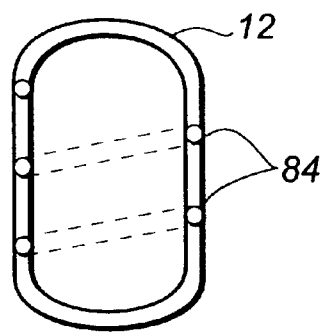
Figure 4K:
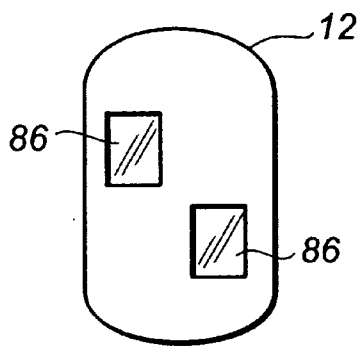

Referring to FIG. 4K, the formulation reservoir 12 can also include any number of suitable high-pressure windows 86 for manual viewing or digital viewing using an appropriate fiber optics or camera set-up. The windows 86 are typically made of sapphire or quartz or other suitable materials that permit the passage of the appropriate frequencies of radiation for viewing/detection/analysis of reservoir contents (using visible, infrared, X-ray etc. viewing/detection/analysis techniques), etc.

The formulation reservoir 12 is made of appropriate materials of construction in order to withstand high pressures of the order of 10,000 psi or greater. Typically, stainless steel is the preferred material of construction although other high pressure metals, metal alloys, and/or metal composites can be used.

Figure 1F:
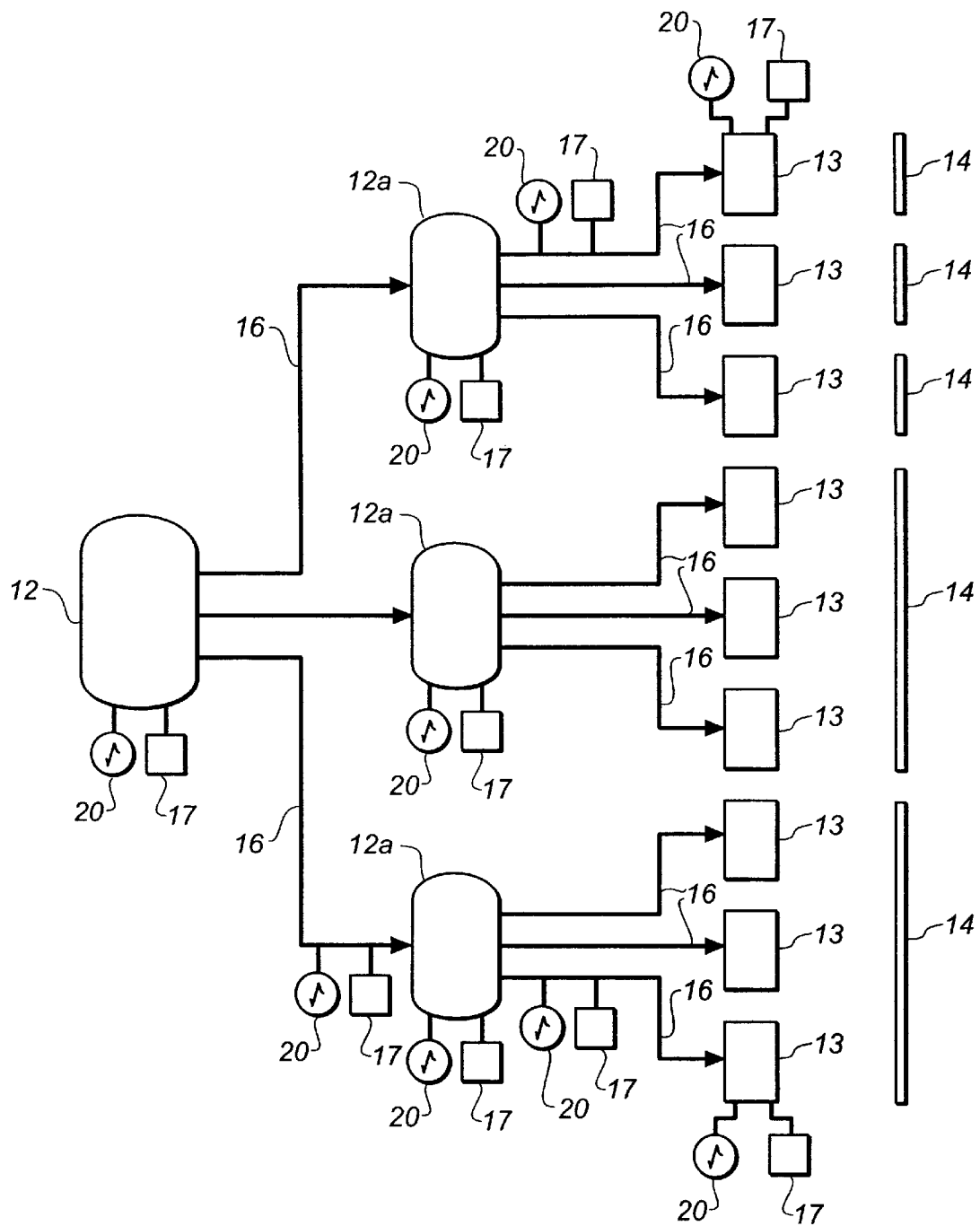

Referring to FIG. 1F, in an alternative arrangement, the thermodynamically stable/metastable mixture of functional material and compressed liquid/supercritical fluid can be prepared in one formulation reservoir 12 and then transported to one or more additional formulation reservoirs 12a. For example, a single large formulation reservoir 12 can be suitably connected to one or more subsidiary high pressure vessels 12a that maintain the functional material and compressed liquid/supercritical fluid mixture at controlled temperature and pressure conditions with each subsidiary high pressure vessel 12a feeding one or more discharge devices 13. Either or both reservoirs 12 and 12a can be equipped with the temperature control mechanism 20 and/or pressure control mechanisms 17. The discharge devices 13 can direct the mixture towards a single receiver 14 or a plurality of receivers 14.

Figure 1G:
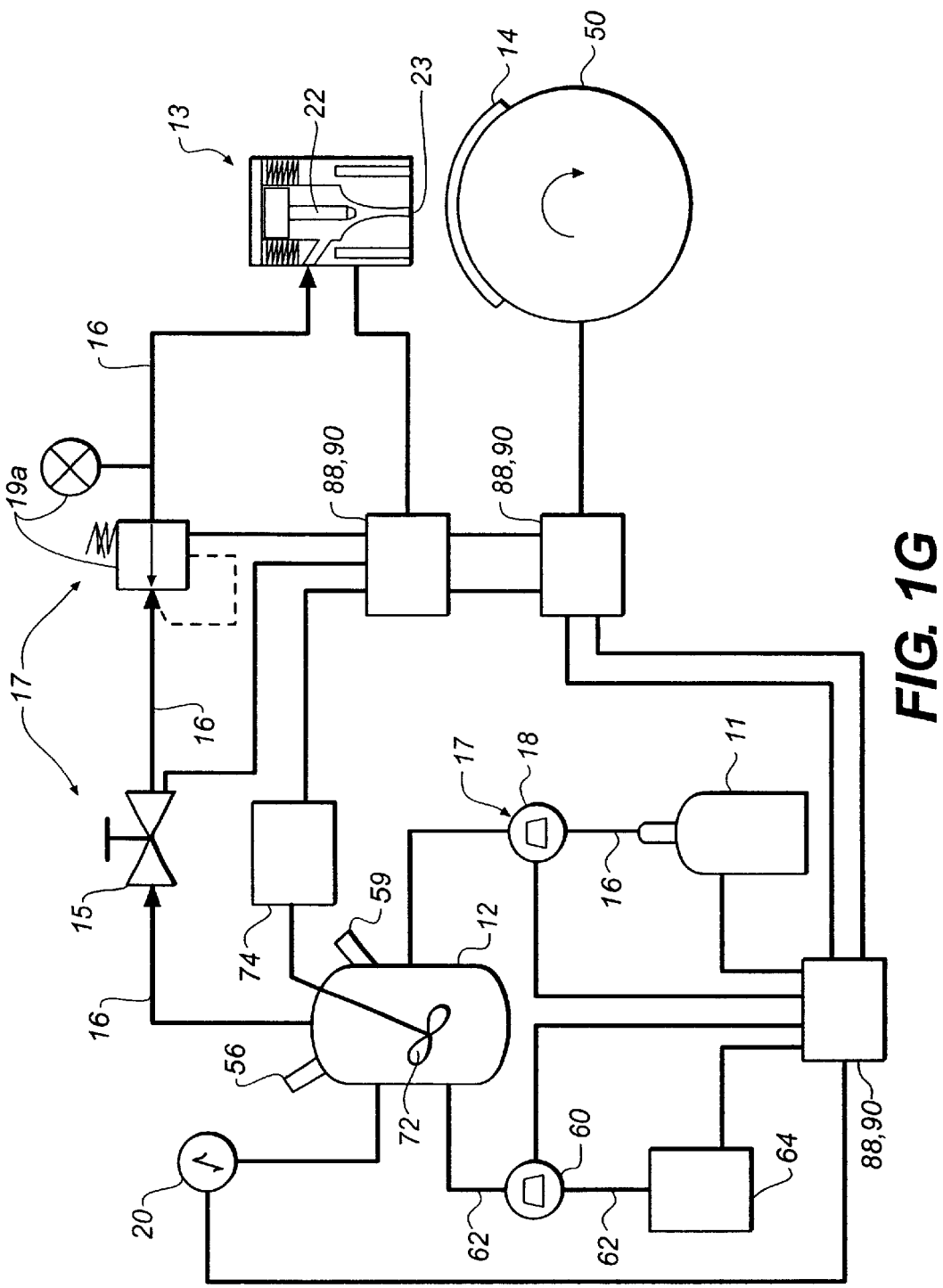

Referring to FIG. 1G, the delivery system 10 can include ports for the injection of suitable functional material, view cells, and suitable analytical equipment such as Fourier Transform Infrared Spectroscopy, Light Scattering, Ultra-Violet or Visible Spectroscopy, etc. to permit monitoring of the delivery system 13 and the components of the delivery system. Additionally, the delivery system 10 can include any number of control devices 88, microprocessors 90, etc., used to control the delivery system 10.

Figure 2A:
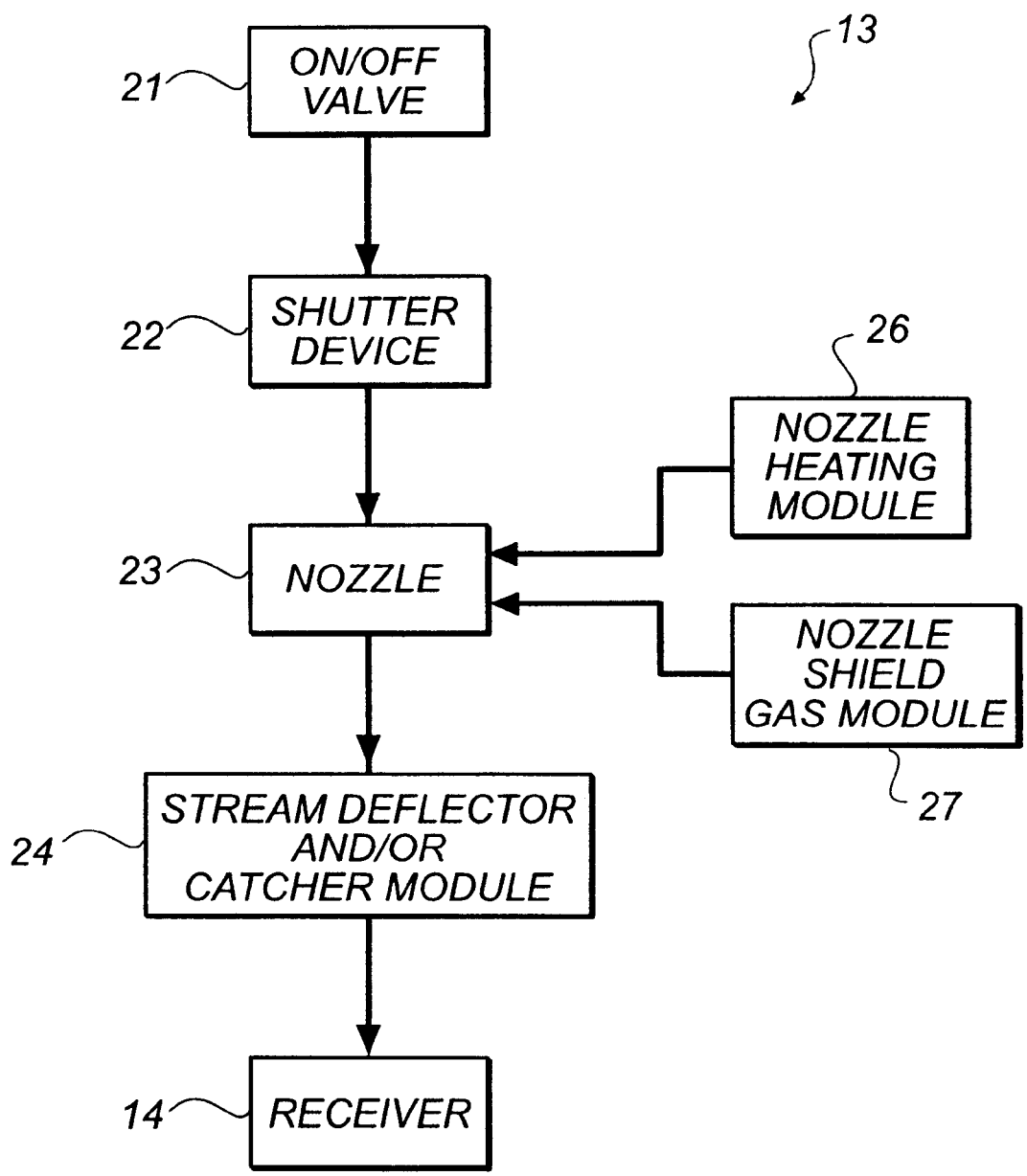
FIG. 2A is a block diagram of a discharge device made in accordance with the present invention.
Figure 2E:
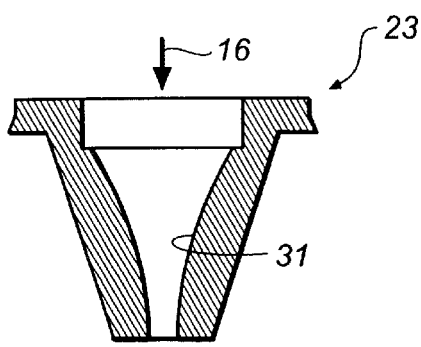
Figure 2F:
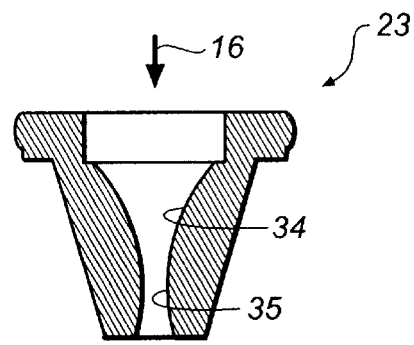

Referring to FIG. 2A, the discharge device 13 is described in more detail. The discharge assembly can include an on/off valve 21 that can be manually or automatically actuated to regulate the flow of the supercritical fluid or compressed liquid formulation. The discharge device 13 includes a shutter device 22 which can also be a programmable valve. The shutter device 22 is capable of being controlled to turn off the flow and/or turn on the flow so that the flow of formulation occupies all or part of the available cross-section of the discharge device 13. Additionally, the shutter device is capable of being partially opened or closed in order to adjust or regulate the flow of formulation. The discharge assembly also includes a nozzle 23. The nozzle 23 can be provided, as necessary, with a nozzle heating module 26 and a nozzle shield gas module 27 to assist in beam collimation. The discharge device 13 also includes a stream deflector and/or catcher module 24 to assist in beam collimation prior to the beam reaching a receiver 14. Components 22–24, 26, and 27 of discharge device 13 are positioned relative to delivery path 16 such that the formulation continues along delivery path 16.

Alternatively, the shutter device 22 can be positioned after the nozzle heating module 26 and the nozzle shield gas module 27 or between the nozzle heating module 26 and the nozzle shield gas module 27. Additionally, the nozzle shield gas module 27 may not be required for certain applications, as is the case with the stream deflector and catcher module 24. Alternatively, discharge device 13 can include a stream deflector and catcher module 24 and not include the shutter device 22. In this situation, the stream deflector and catcher module 24 can be moveably positioned along delivery path 16 and used to regulate the flow of formulation such that a continuous flow of formulation exits while still allowing for discontinuous deposition and/or etching.

The nozzle 23 can be capable of translation in x, y, and z directions to permit suitable discontinuous and/or continuous functional material deposition and/or etching on the receiver 14. Translation of the nozzle 23 can be achieved through manual, mechanical, pneumatic, electrical, electronic or computerized control mechanisms. Receiver 14 and/or media conveyance mechanism 50 can also be capable of translation in x, y, and z directions to permit suitable functional material deposition and/or etching on the receiver 14. Alternatively, both the receiver 14 and the nozzle 23 can be translatable in x, y, and z directions depending on the particular application.

Referring to FIGS. 2B–2J, the nozzle 23 functions to direct the formulation flow towards the receiver 14. It is also used to attenuate the final velocity with which the functional material impinges on the receiver 14. Accordingly, nozzle geometry can vary depending on a particular application. For example, nozzle geometry can be a constant area having a predetermined shape (cylinder 28, square 29, triangular 30, etc.) or variable area converging 31, variable area diverging 38, or variable area converging-diverging 32, with various forms of each available through altering the angles of convergence and/or divergence. Alternatively, a combination of a constant area with a variable area, for example, a converging-diverging nozzle with a tubular extension, etc., can be used. In addition, the nozzle 23 can be coaxial, asymmetric, asymmetric, or any combination thereof (shown generally at 33). The shape 28, 29, 30, 31, 32, 33 of the nozzle 23 can assist in regulating the flow of the formulation. In a preferred embodiment of the present invention, the nozzle 23 includes a converging section or module 34, a throat section or module 35, and a diverging section or module 36. The throat section or module 35 of the nozzle 23 can have a straight section or module 37.

The discharge device 13 serves to direct the functional material onto the receiver 14. The discharge device 13 or a portion of the discharge device 13 can be stationary or can swivel or raster, as needed, to provide high resolution and high precision deposition of the functional material onto the receiver 14 or etching of the receiver 14 by the functional material. Alternatively, receiver 14 can move in a predetermined way while discharge device 13 remains stationary. The shutter device 22 can also be positioned after the nozzle 23. As such, the shutter device 22 and the nozzle 23 can be separate devices so as to position the shutter 22 before or after the nozzle 23 with independent controls for maximum deposition and/or etching flexibility. Alternatively, the shutter device 22 can be integrally formed within the nozzle 23.

Figure 3B:
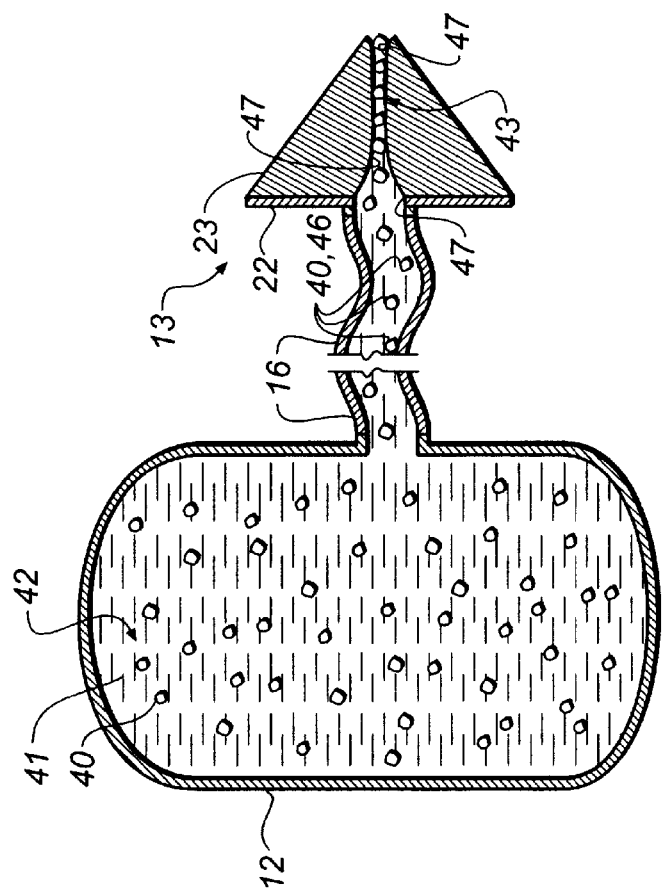
FIGS. 3A–3D are schematic diagrams showing the operation of the present invention.
Figure 3A:
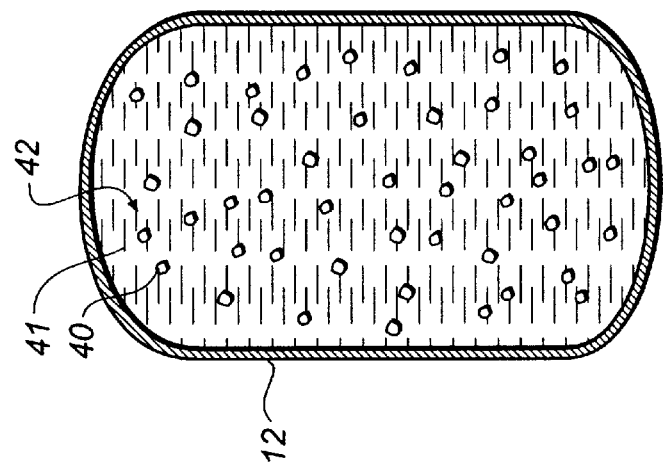
Figure 3C:
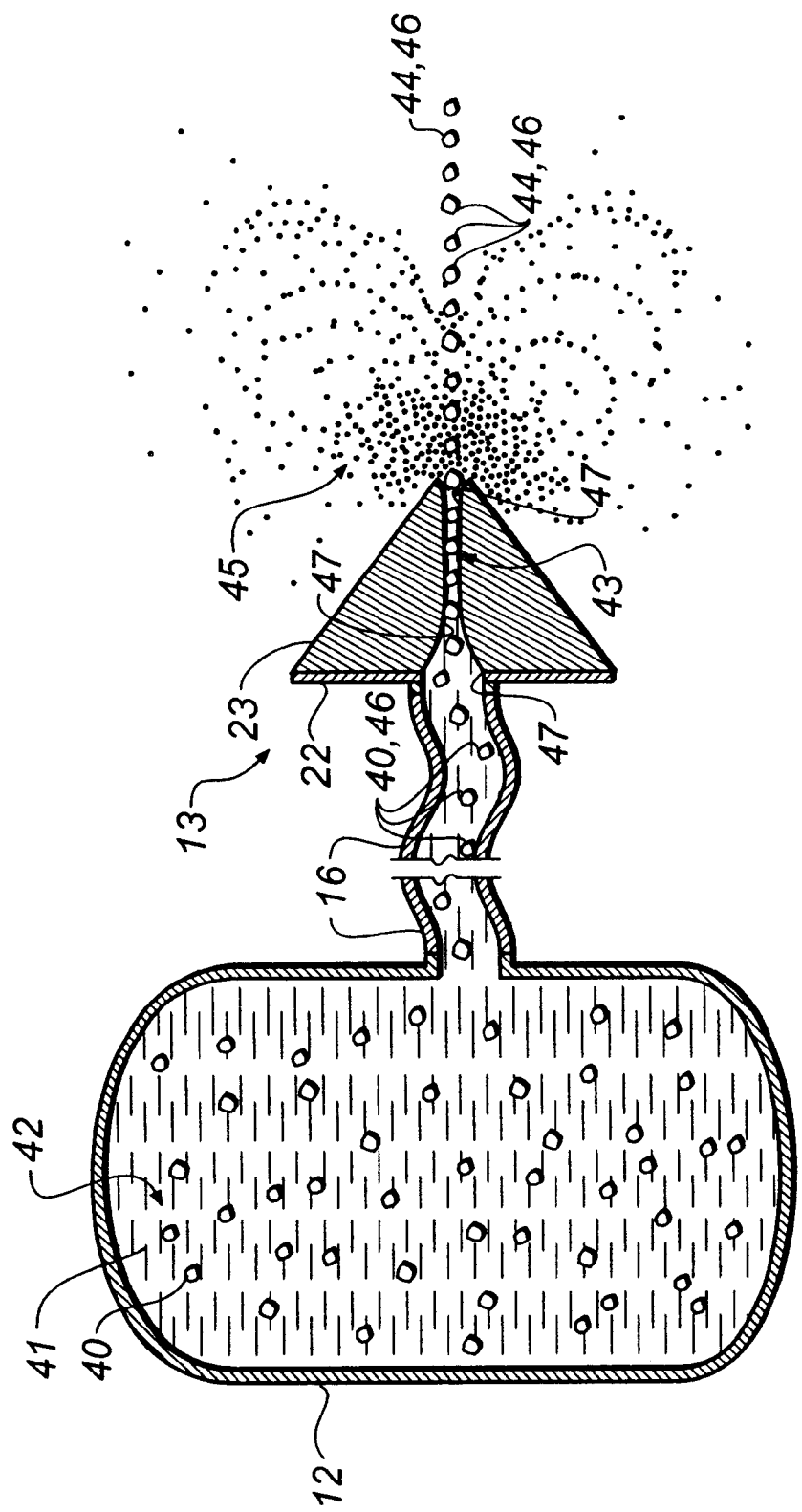
Figure 3D:
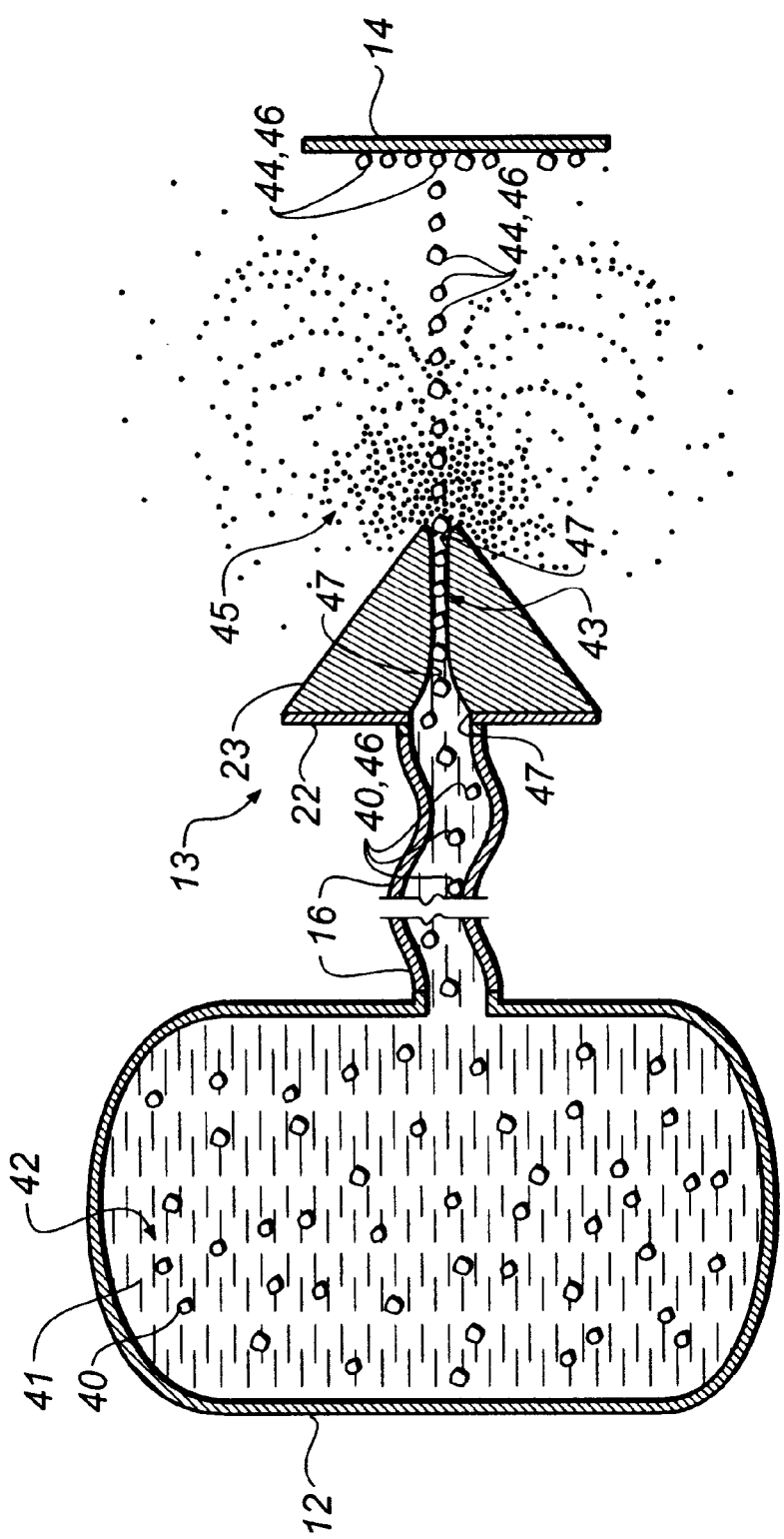

Operation of the delivery system 10 will now be described. FIGS. 3A–3D are diagrams schematically representing the operation of delivery system 10 and should not be considered as limiting the scope of the invention in any manner. A formulation 42 of functional material 40 in a supercritical fluid and/or compressed liquid 41 is prepared in the formulation reservoir 12. A functional material 40, any material of interest in solid or liquid phase, can be dispersed (as shown in FIG. 3A) and/or dissolved in a supercritical fluid and/or compressed liquid 41 making a mixture or formulation 42. The functional material 40 can have various shapes and sizes depending on the type of the functional material 40 used in the formulation.

The supercritical fluid and/or compressed liquid 41, forms a continuous phase and functional material 40 forms a dispersed and/or dissolved single phase. The formulation 42 (the functional material 40 and the supercritical fluid and/or compressed liquid 41) is maintained at a suitable temperature and a suitable pressure for the functional material 40 and the supercritical fluid and/or compressed liquid 41 used in a particular application The shutter 22 is actuated to enable the ejection of a controlled quantity of the formulation 42. The nozzle 23 collimates and/or focuses the formulation 42 into a beam 43.

The functional material 40 is controllably introduced into the formulation reservoir 12. The compressed liquid/supercritical fluid 41 is also controllably introduced into the formulation reservoir 12. The contents of the formulation reservoir 12 are suitably mixed using mixing device 70 to ensure intimate contact between the functional material 40 and compressed liquid/supercritical fluid 41. As the mixing process proceeds, functional material 40 is dissolved or dispersed within the compressed liquid/supercritical fluid 41. The process of dissolution/dispersion, including the amount of functional material 40 and the rate at which the mixing proceeds, depends upon the functional material 40 itself, the particle size and particle size distribution of the functional material 40 (if the functional material 40 is a solid), the compressed liquid/supercritical fluid 41 used, the temperature, and the pressure within the formulation reservoir 12. When the mixing process is complete, the mixture or formulation 42 of functional material and compressed liquid/supercritical fluid is thermodynamically stable/metastable in that the functional material is dissolved or dispersed within the compressed liquid/supercritical fluid in such a fashion as to be indefinitely contained in the same state as long as the temperature and pressure within the formulation chamber are maintained constant. This state is distinguished from other physical mixtures in that there is no settling, precipitation, and/or agglomeration of functional material particles within the formulation chamber unless the thermodynamic conditions of temperature and pressure within the reservoir are changed. As such, the functional material 40 and compressed liquid/supercritical fluid 41 mixtures or formulations 42 of the present invention are said to be thermodynamically stable/metastable.

The functional material 40 can be a solid or a liquid. Additionally, the functional material 40 can be an organic molecule, a polymer molecule, a metallo-organic molecule, an inorganic molecule, an organic nanoparticle, a polymer nanoparticle, a metallo-organic nanoparticle, an inorganic nanoparticle, an organic microparticles, a polymer microparticle, a metallo-organic microparticle, an inorganic microparticle, and/or composites of these materials, etc. After suitable mixing with the compressed liquid/supercritical fluid 41 within the formulation reservoir 12, the functional material 40 is uniformly distributed within a thermodynamically stable/metastable mixture, that can be a solution or a dispersion, with the compressed liquid/supercritical fluid 41. This thermodynamically stable/metastable mixture or formulation 42 is controllably released from the formulation reservoir 12 through the discharge device 13.

During the discharge process, the functional material 40 is precipitated from the compressed liquid/supercritical fluid 41 as the temperature and/or pressure conditions change. The precipitated functional material 44 is directed towards a receiver 14 by the discharge device 13 as a focussed and/or collimated beam. The particle size of the functional material 40 deposited on the receiver 14 is typically in the range from one nanometer to 1000 nanometers. The particle size distribution may be controlled to be uniform by controlling the rate of change of temperature and/or pressure in the discharge device 13, the location of the receiver 14 relative to the discharge device 13, and the ambient conditions outside of the discharge device 13.

The delivery system 10 is also designed to appropriately change the temperature and pressure of the formulation 42 to permit a controlled precipitation and/or aggregation of the functional material 40. As the pressure is typically stepped down in stages, the formulation 42 fluid flow is self-energized. Subsequent changes to the formulation 42 conditions (a change in pressure, a change in temperature, etc.) result in the precipitation and/or aggregation of the functional material 40 coupled with an evaporation (shown generally at 45) of the supercritical fluid and/or compressed liquid 41. The resulting precipitated and/or aggregated functional material 44 deposits on the receiver 14 in a precise and accurate fashion. Evaporation 45 of the supercritical fluid and/or compressed liquid 41 can occur in a region located outside of the discharge device 13. Alternatively, evaporation 45 of the supercritical fluid and/or compressed liquid 41 can begin within the discharge device 13 and continue in the region located outside the discharge device 13. Alternatively, evaporation 45 can occur within the discharge device 13.

A beam 43 (stream, etc) of the functional material 40 and the supercritical fluid and/or compressed liquid 41 is formed as the formulation 42 moves through the discharge device 13. When the size of the precipitated and/or aggregated functional material 44 is substantially equal to an exit diameter of the nozzle 23 of the discharge device 13, the precipitated and/or aggregated functional material 44 has been collimated by the nozzle 23. When the size of the precipitated and/or aggregated functional material 44 is less than the exit diameter of the nozzle 23 of the discharge device 13, the precipitated and/or aggregated functional material 44 has been focused by the nozzle 23.

The receiver 14 is positioned along the path 16 such that the precipitated and/or aggregated functional material 44 is deposited on the receiver 14. As the individual particle size of the precipitated and/or aggregated functional material 44 is extremely small, adhesion forces are sufficient to keep the particles in place on the receiver 14.

The distance of the receiver 14 from the discharge assembly is chosen such that the supercritical fluid and/or compressed liquid 41 evaporates from the liquid and/or supercritical phase to the gas phase (shown generally at 45) prior to reaching the receiver 14. Hence, there is no need for subsequent receiver-drying processes. Further, subsequent to the ejection of the formulation 42 from the nozzle 23 and the precipitation of the functional material, additional focusing and/or collimation may be achieved using external devices such as electromagnetic fields, mechanical shields, magnetic lenses, electrostatic lenses etc. Alternatively, the receiver 14 can be electrically or electrostatically charged such that the position of the functional material 40 can be controlled.

It is also desirable to control the velocity with which individual particles 46 of the functional material 40 are ejected from the nozzle 23. As there is a sizable pressure drop from within the delivery system 10 to the operating environment, the pressure differential converts the potential energy of the delivery system 10 into kinetic energy that propels the functional material particles 46 onto the receiver 14. The velocity of these particles 46 can be controlled by suitable nozzle design and control over the rate of change of operating pressure and temperature within the system. Further, subsequent to the ejection of the formulation 42 from the nozzle 23 and the precipitation of the functional material 40, additional velocity regulation of the functional material 40 may be achieved using external devices such as electromagnetic fields, mechanical shields, magnetic lenses, electrostatic lenses etc. Nozzle design and location relative to the receiver 14 also determine the pattern of functional material 40 deposition. The actual nozzle design will depend upon the particular application addressed.

Figure 2G:
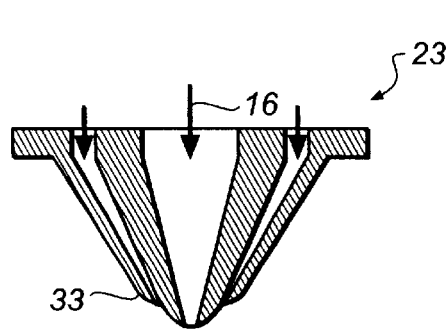
Figure 2H:
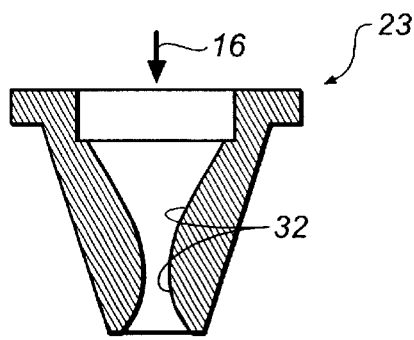
Figure 2I:
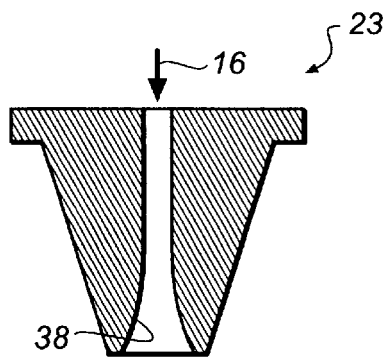
Figure 2J:
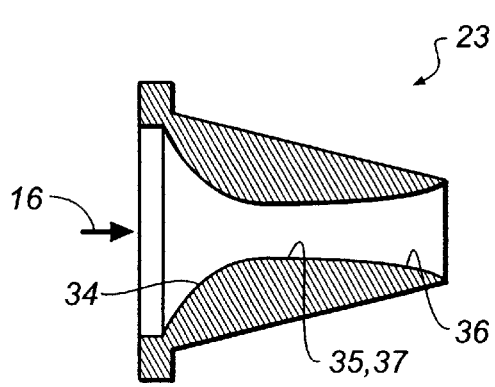

The nozzle 23 temperature can also be controlled. Nozzle temperature control may be controlled as required by specific applications to ensure that the nozzle opening 47 maintains the desired fluid flow characteristics. Nozzle temperature can be controlled through the nozzle heating module 26 using a water jacket, electrical heating techniques, etc. With appropriate nozzle design, the exiting stream temperature can be controlled at a desired value by enveloping the exiting stream with a co-current annular stream of a warm or cool, inert gas, as shown in FIG. 2G.

The receiver 14 is a solid typically made from an organic, an inorganic, a metallo-organic, a metallic, an alloy, a ceramic, a synthetic and/or natural polymer, a gel, a glass, and a composite material. The receiver 14 can be porous or non-porous and comprise a single layer or a plurality of layers. When the receiver 14 has a plurality of layers, several techniques can be used to create additional layers (e.g. coating, coextrusion, lamination, deposition, etc.).

The location and accuracy of deposition of the functional material 40 onto or into the receiver 14 is dependent upon the application. For example, in certain printing applications it may be desirable for the functional material 40, if the functional material 40 is a dye particle, to be deposited on the receiver surface for maximum optical density of the resulting image. In other printing applications, it may be desirable to locate the functional material 40 close to but not at the receiver surface in order to improve image lightfastness and image waterfastness of the resulting image. In other imaging applications, it may be desirable to locate the functional material 40 significantly below the surface to retain maximum receiver gloss and create special image effects (e.g. pearlescence, limited angle-viewing properties, etc.).

The deposition characteristics of the functional material 40 are a function of several factors including the bulk modulus of the receiver 14, the bulk modulus of the functional material 40, density of the receiver 14, the density of the functional material 40, the pressure-difference between the formulation reservoir and ambient conditions, the temperature difference between the formulation reservoir and ambient conditions, the deposition time, the discharge nozzle geometry, the distance between the discharge nozzle and the receiver, functional material size and momentum, etc. These factors can be modified or held constant depending on the application. For example, in a printing application wherein the functional material 40 is to be deposited on the receiver surface, the nozzle geometry, formulation conditions, ambient conditions, and functional material can be fixed. The deposition of the functional material 40 can then be controlled by altering the receiver design (e.g. the bulk modulus of the receiver, the distance between the discharge nozzle and the receiver, the deposition time, etc.). Alternatively, for the same application, it is possible to alter formulation conditions (e.g. functional material concentration, etc.). Alternatively, for a printing application wherein the functional material 40 is to be deposited within the receiver, the deposition can be controlled by altering the receiver design (e.g. the bulk modulus of the receiver, formulation conditions, etc.), while keeping the other parameters fixed.

For a given constant nozzle geometry, constant conditions within the formulation reservoir, unchanging ambient conditions, constant deposition time, and a constant distance between the tip of the discharge nozzle and the receiver, the main receiver property that governs the accuracy of deposition of the functional material 40 is the receiver bulk modulus relative to the functional material bulk modulus. The bulk modulus of a material, typically expressed in Pascals, is a measure of its compressibility or its ability to absorb the momentum of a particle. Specifically, it is a measure of the change in volume of the material as the pressure is changed. It may be expressed isothermally or adiabatically. The isothermal bulk modulus is specified in this application.

The receiver can be a single layer or multi-layer receiver having one or more layers with a bulk modulus of between 10 Mpa and 100 GPa positioned at a distance between 0.01 cm and 25 cm from the nozzle of the discharge device.

The choice of receiver bulk modulus also depends on the functional material bulk modulus. With all other parameters held constant, if the receiver bulk modulus is significantly larger than that of the functional material, it can be reasonably expected that the functional material particles are significantly altered in shape upon impact with the receiver 14. Alternatively, when the functional material bulk modulus is much higher than that of the receiver, the functional material particles may retain much of their original shape even after impact with the receiver 14.

The receiver 14 can comprise multiple layers of varying bulk moduli. In applications in which the functional material 40 is to be located in a layer other than in the top layer, receiver layers of varying bulk moduli may be selected and layered in such a fashion as to allow the functional material 14 to penetrate through the top layer or layers and into the layer of choice.

Other properties of the receiver 14 have to be considered depending on the application for broad consumer acceptance. These properties (e.g. basis weight, caliper, stiffness, smoothness, gloss, whiteness, opacity, etc.) should lie within a narrow range of values for broad consumer acceptance. These property concerns can be addressed when developing receiver designs incorporating one or more layers having a bulk modulus within the specified range for controlling the depth of deposition of the functional material 40.

Experimental Results

The experimental results described below illustrate the use of one possible receiver design in conjunction with the delivery system 10 that focuses a beam of functional material dispersed in a dense fluid solvent. The experimental results also demonstrate that the functional material 40 can be discharged from a dense fluid solvent and accurately located on a surface or within the surface of a receiver 14. It should be understood that the results described below are not intended to limit the scope of the invention in any manner and that variations and modifications can be effected within the scope of this invention.

Referring to FIGS. 5A–6B, in the following experiments, a photo quality ink jet paper, manufactured by Eastman Kodak Company, Rochester, N.Y., was used as the receiver of choice. The design of this receiver is described in U.S. Pat. No. 6,040,060, which is incorporated herein by reference. The receiver 14 comprises raw paper base 92 that is then resin coated on both sides. Subsequently this paper 92 is coated on one side with two ink receiving layers 94, 96. The base layer 94 comprises gelatin and a material selected from the group consisting of carboxymethyl cellulose, polyvinylpyrrolidone, polyvinylalcohol, hydroxyethyl cellulose and mixtures thereof. The top layer 96 comprises a material selected from the group consisting of an acrylic acid-diallyldimethylammonium chloride-hydroxypropyl acrylic copolymer and acrylic acid-diallyldimethylammonium chloride polymer. The top layer 96 is approximately 1–3 micrometers thick while the base layer 94 that contacts the resin coated paper comprises is approximately 10–15 micrometers thick.

The delivery system 10 included a pressurized variable volume formulation reservoir 12 placed in a constant temperature water bath (temperature control mechanism 20). The formulation reservoir 12 was connected to the discharge device 13 which included a 5 cm long stainless steel tube of inner diameter 127 $\mu$m through a six port sampling/injecting valve which could be opened and closed for a desired, fixed length of time, $\tau$. The receiver 14, Medium C, mounted on a base 50, was positioned at a desired, fixed distance, L, away from the tip of the stainless tubing.

The solvent used was liquid carbon dioxide obtained from a carbondioxide source 11 through high pressure syringe pump 18. The functional material used, Dye A, was Duasyn Acid Blue dye, a triphenylmethane dye with the structure shown below:

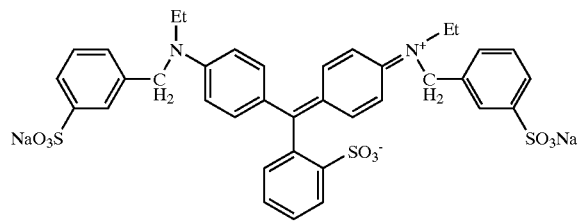

Duasyn Acid Blue AE-02
(Acid Blue 9)
MW~793 g/mol

To assist in the salvation of the blue dye into carbon dioxide, a small amount of water, and a surfactant, Fomblin MF 300, a perfluoropolyether ammonium carboxylate, with the structure shown below, were also used.

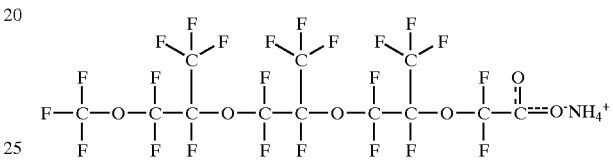

The concentration of the various species in each of the formulations used is listed in Table 1.

TABLE 1

|  | Formulation A | Formulation B |
|---|---|---|
| Concentration of Dye A | 0.07 wt % | 0.002% |
| Concentration Surfactant A | 5 wt % | 8.94 wt % |
| Concentration of water | 0.46 wt % | 1.66 wt % |
| Concentration of $CO_2$ | 97 wt % | 89.4% |

Pressure inside the formulation reservoir 12 was adjusted to be 2500 psig. The temperature was maintained at 25 degrees Centigrade. The formulation 42 was exposed to ambient conditions for short, fixed time periods, $\tau$, by opening and closing valve D of discharge device 13. This resulted in the sudden release of the formulation 42 into the surrounding atmosphere.

The drop in pressure experienced by formulation 42 resulted in the evaporation of the carbon dioxide solvent and the precipitation of the dye, surfactant, and water mixture. The precipitated dye particles, driven by the pressure difference between the formulation reservoir 12 and the surrounding 15 atmosphere, moved towards the receiver 14 with a high velocity estimated to be of the order of over 300 meters per second.

The size and nature of the deposited dye particles was influenced by the formulation type and the time of exposure of the formulation to ambient conditions. Results of varying formulation type and time of exposure are tabulated in Table 2, Table 3, and Table 4 listed below:

TABLE 2

| Experiment # | Formulation Type | L, mm | $\tau$, seconds | Image Size, $\mu$m |
|---|---|---|---|---|
| 1 | A | 1.0 | 0 5 | 200 |
| 2 | A | 1.0 | 1.0 | 320 |
| 3 | A | 1.0 | 2.0 | 1000 |

TABLE 3

| Experiment # | Formulation Type | L, mm | τ, seconds | Image Size, μm |
|---|---|---|---|---|
| 1 | A | 1.0 | 0.5 | 200 |
| 2 | B | 1.0 | 0.5 | 75 |

TABLE 4

| Experiment # | Formulation Type | L, mm | τ, seconds |
|---|---|---|---|
| 1 | A | 2 | 0.5 |
| 2 | A | 2 | 1 |

Samples of the deposited dye drops on the receiver 14 obtained from the experiments described in Table 1 and Table 4 were cut into 2 micrometer sections and images of the cross-sections were obtained using an optical microscope.

Figure 5A:
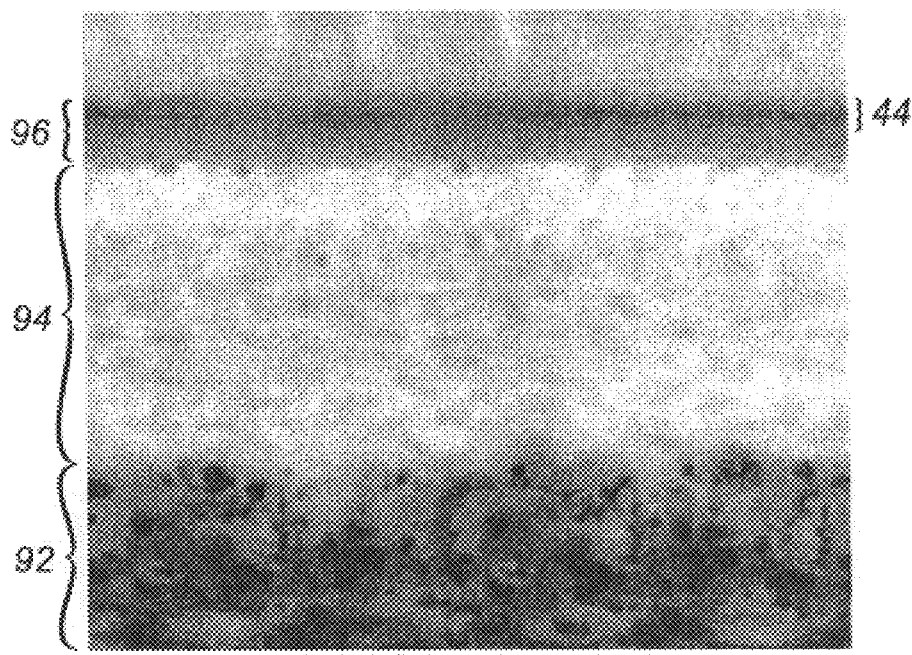
FIG. 5A is a cross-sectional photomicrograph of functional material deposited onto a receiver.
Figure 5B:
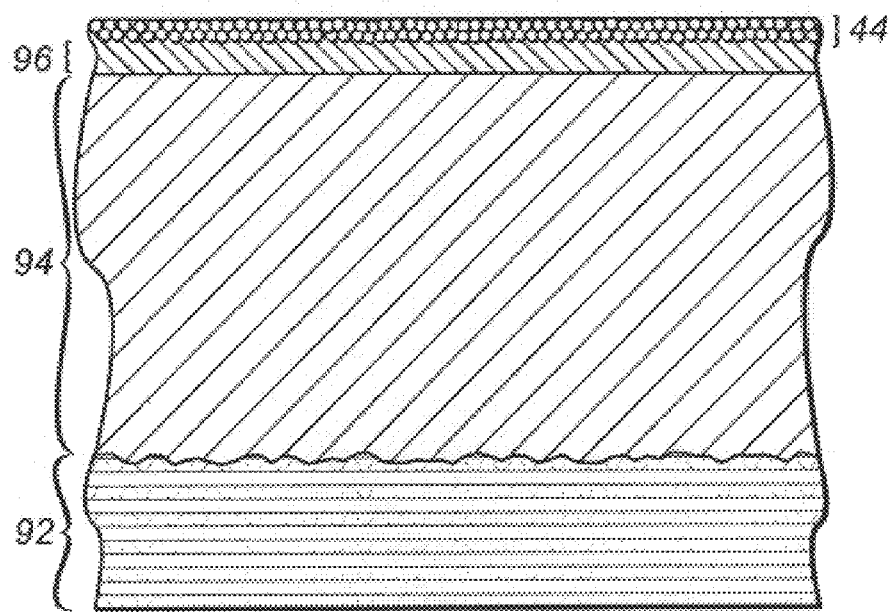
FIGS. 5B and 5C are schematic cross-sectional views of the photomicrograph shown in FIG. 5A.
Figure 5C:
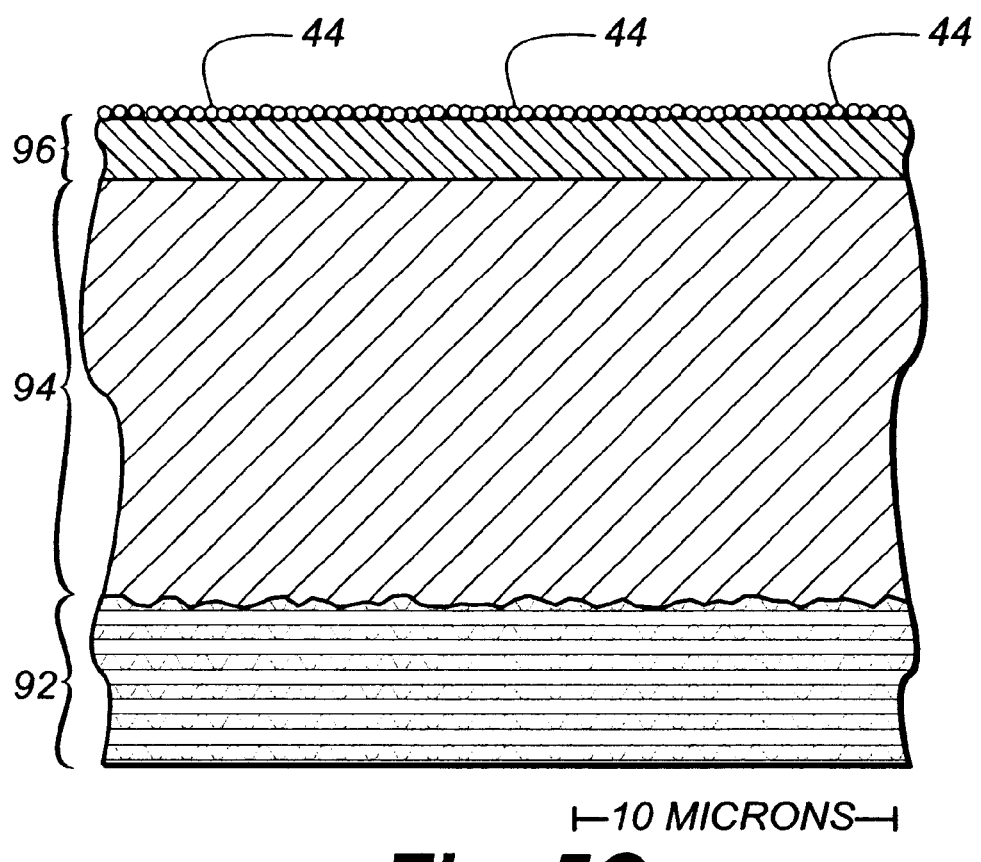
Figure 6A:
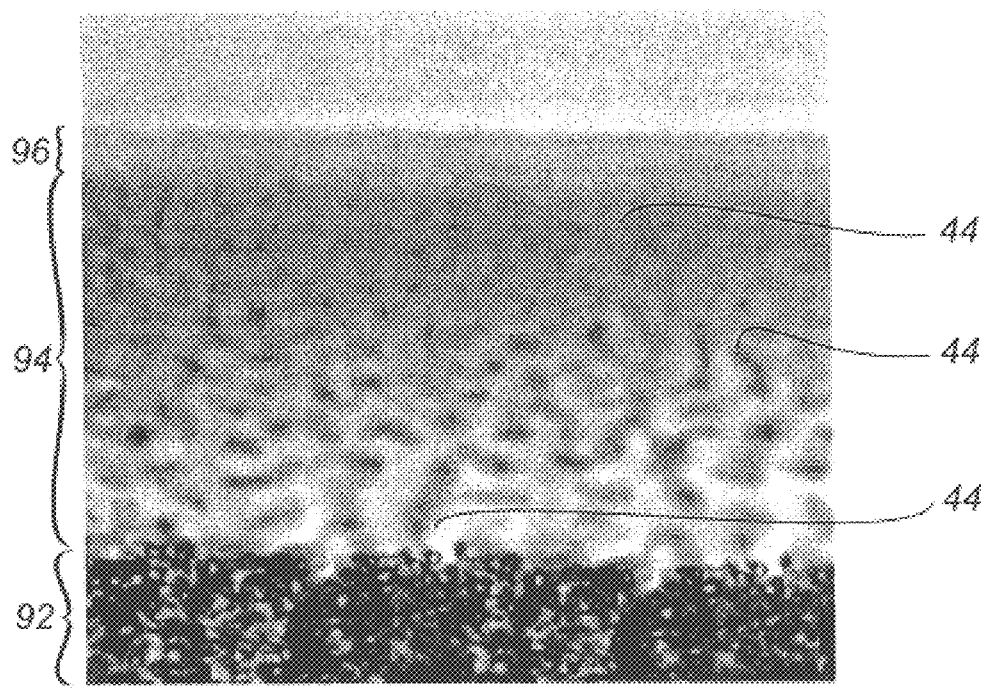
FIG. 6A is a cross-sectional photomicrograph of functional material deposited into a receiver.
Figure 6B:
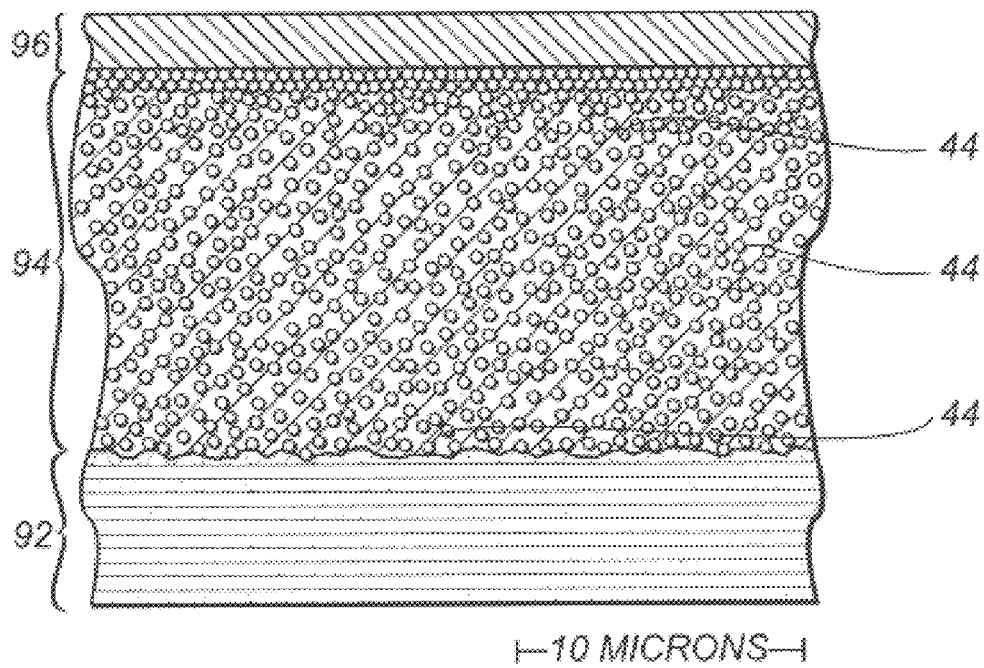
FIG. 6B is a schematic cross-sectional view of the photomicrograph shown in FIG. 6A.
Figure 7A:
FIG. 7A is a cross-section photomicrograph of a conventional inkjet image.
Figure 7B:
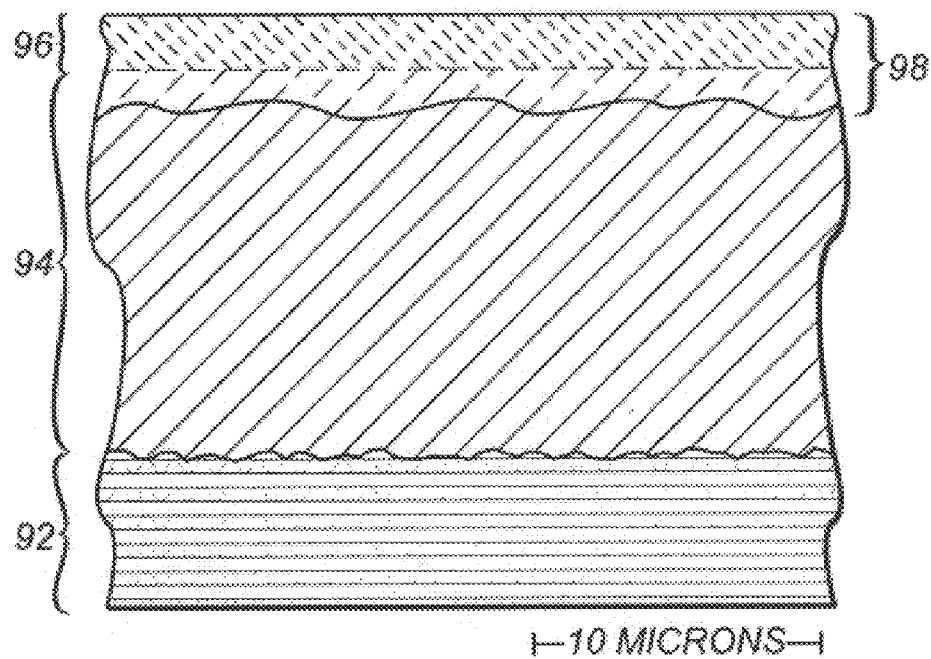
FIG. 7B is a schematic cross-sectional view of the photomicrograph shown in FIG. 7A.

FIGS. 5A–5C show photomicrograph and schematic cross-sections generated from a sample from Experiment No. 1 on Table 4 and FIGS. 6A and 6B show photomicrograph and schematic cross-sections generated from a sample from Experiment No. 2 on Table 4. Dye A (precipitated functional material 44) was deposited onto or inside the image receiving layers 94, 96 of the receiver 14 by proper choice of the deposition conditions, in this case, the time of deposition. The dye 44 is located primarily within the top 1.5 micrometers of the top layer 96 in FIGS. 5A–5C, and is located primarily in the base layer 94 in FIGS. 6A and 6B.

The invention has been described in detail with particular reference to certain preferred embodiments thereof, but it will be understood that variations and modifications can be effected within the spirit and scope of the invention.

What is claimed is:

1. A method of delivering a functional material to a receiver comprising in order:
    providing a mixture of a fluid having a solvent and a functional material;
    causing the functional material to become free of the solvent;
    causing the functional material to contact a receiver having a plurality of layers; and
    causing the functional material to penetrate and pass through a first layer of the receiver, and penetrate a second layer of the receiver such that the second layer primarily contains the functional material.

2. The method according to claim 1, wherein providing the mixture of the fluid having the solvent and the functional material includes providing a thermodynamically stable mixture of the fluid having the solvent and the functional material.

3. The method according to claim 1, wherein providing the mixture of the fluid having the solvent and the functional material includes providing a mixture of a compressed liquid and the functional material.

4. The method according to claim 1, wherein providing the mixture of the fluid having the solvent and the functional material includes providing a mixture of a supercritical fluid and the functional material.

5. The method according to claim 1, wherein causing the functional material to become free of the solvent includes moving the mixture from a first predetermined thermodynamic state to a second thermodynamic state.

6. The method according to claim 5, wherein moving the mixture from a first predetermined thermodynamic state to a second thermodynamic state evaporates the solvent.

7. The method according to claim 5, the mixture being contained under a predetermined pressure, wherein moving the mixture from a first predetermined thermodynamic state to a second thermodynamic state includes decreasing the predetermined pressure.

8. The method according to claim 5, the mixture being contained under a predetermined temperature, wherein moving the mixture from a first predetermined thermodynamic state to a second thermodynamic state includes decreasing the predetermined temperature.

9. The method according to claim 1, further comprising selectively positioning the functional material within the second layer of the receiver.

10. A method of delivering a functional material to a receiver comprising:
    providing a source of a thermodynamically stable mixture of a solvent in a liquid state and a functional material;
    providing a discharge device having a nozzle in fluid communication with the source of the thermodynamically stable mixture;
    positioning a receiver at a predetermined distance from the nozzle;
    ejecting the thermodynamically stable mixture from the nozzle, the solvent changing from the liquid state to a gaseous state; and
    depositing the solvent free functional material on the receiver, the receiver having a plurality of layers, wherein ejecting the thermodynamically stable mixture from the nozzle includes opening a shutter for a first predetermined amount of time such that depositing the solvent free functional material on the receiver includes the functional material penetrating a first layer of the receiver and includes opening the shutter for a second predetermined amount of time such that depositing the solvent free functional material on the receiver includes the functional material penetrating and passing through a first layer of the receiver, and penetrating a second layer of the receiver such that the second layer primarily contains the functional material, the second predetermined amount of time being greater than the first predetermined amount of time.

11. The method according to claim 10, wherein providing the mixture of the solvent and the functional material includes providing a mixture of a compressed liquid and the functional material.

12. The method according to claim 10, wherein providing the mixture of the solvent and the functional material includes providing a mixture of a supercritical fluid and the functional material.

13. The method according to claim 10, the mixture being contained under a predetermined pressure, wherein ejecting the thermodynamically stable mixture from the nozzle includes decreasing the predetermined pressure.

14. The method according to claim 10, the mixture being contained under a predetermined temperature, wherein ejecting the thermodynamically stable mixture from the nozzle includes decreasing the predetermined temperature.

15. A method of delivering a functional material to a receiver comprising:
    providing a source of a thermodynamically stable mixture of a solvent in a supercritical state and a functional material, the thermodynamically stable mixture being contained under a predetermined pressure;
    providing a discharge device having a nozzle in fluid communication with the source of the thermodynamically stable mixture;

positioning a receiver at a predetermined distance from the nozzle;

ejecting the thermodynamically stable mixture from the nozzle, the solvent changing from the supercritical state to a gaseous state such that the functional material becomes solvent free; and depositing the solvent free functional material on the receiver, wherein ejecting the thermodynamically stable mixture from the nozzle includes decreasing the predetermined pressure.

16. The method according to claim 15, the receiver having a surface, the method further comprising causing the functional material to penetrate the surface of the receiver.

17. The method according to claim 15, the receiver having a layer, the method further comprising selectively positioning the functional material within the layer of the receiver.

18. The method according to claim 15, the receiver having a surface, the method further comprising selectively positioning the functional material on the surface of the receiver.

19. The method according to claim 15, the receiver having a plurality of layers, the method further comprising causing the functional material to penetrate and pass through a first layer of the receiver, and penetrate a second layer of the receiver such that the second layer primarily contains the functional material.

20. The method according to claim 19, further comprising selectively positioning the functional material within the second layer of the receiver.

21. A method of delivering a functional material to a receiver comprising:

providing a source of a thermodynamically stable mixture of a solvent in a supercritical state and a functional material, the thermodynamically stable mixture being contained under a predetermined temperature;

providing a discharge device having a nozzle in fluid communication with the source of the thermodynamically stable mixture;

positioning a receiver at a predetermined distance from the nozzle;

ejecting the thermodynamically stable mixture from the nozzle, the solvent changing from the supercritical state to a gaseous state such that the functional material becomes solvent free; and depositing the solvent free functional material on the receiver, wherein ejecting the thermodynamically stable mixture from the nozzle includes decreasing the predetermined temperature.

22. A method of delivering a functional material to a receiver comprising:

providing a source of a thermodynamically stable mixture of a solvent in a liquid state and a functional material, the thermodynamically stable mixture being contained under a predetermined pressure;

providing a discharge device having a nozzle in fluid communication with the source of the thermodynamically stable mixture;

positioning a receiver at a predetermined distance from the nozzle;

ejecting the thermodynamically stable mixture from the nozzle including decreasing the predetermined pressure, the solvent changing from the liquid state to a gaseous state, wherein the functional material becomes solvent free; and depositing the solvent free functional material on the receiver.

23. The method according to claim 22, wherein providing the thermodynamically stable mixture includes providing a mixture of a supercritical fluid and the functional material.

24. The method according to claim 22, the thermodynamically stable mixture being contained under a predetermined temperature, wherein ejecting the thermodynamically stable mixture from the nozzle includes decreasing the predetermined temperature.

25. The method according to claim 22, wherein providing the thermodynamically stable mixture includes providing a mixture of a compressed liquid and the functional material.

26. The method according to claim 22, the receiver having a plurality of layers, the method further comprising causing the functional material to penetrate and pass through a first layer of the receiver, and penetrate a second layer of the receiver such that the second layer primarily contains the functional material.

27. The method according to claim 26, further comprising selectively positioning the functional material within the second layer of the receiver.

28. A method of delivering a functional material to a receiver comprising:

providing a source of a thermodynamically stable mixture of a solvent in a liquid state and a functional material, the thermodynamically stable mixture being contained under a predetermined temperature;

providing a discharge device having a nozzle in fluid communication with the source of the thermodynamically stable mixture;

positioning a receiver at a predetermined distance from the nozzle;

ejecting the thermodynamically stable mixture from the nozzle including decreasing the predetermined temperature, the solvent changing from the liquid state to a gaseous state, wherein the functional material becomes solvent free; and depositing the solvent free functional material on the receiver.

29. The method according to claim 28, wherein providing the thermodynamically stable mixture includes providing a mixture of a supercritical fluid and the functional material.

30. The method according to claim 28, the thermodynamically stable mixture being contained under a predetermined pressure, wherein ejecting the thermodynamically stable mixture from the nozzle includes decreasing the predetermined pressure.

31. The method according to claim 28, wherein providing the thermodynamically stable mixture includes providing a mixture of a compressed liquid and the functional material.

32. The method according to claim 28, the receiver having a plurality of layers, the method further comprising causing the functional material to penetrate and pass through a first layer of the receiver, and penetrate a second layer of the receiver such that the second layer primarily contains the functional material.

33. The method according to claim 32, further comprising selectively positioning the functional material within the second layer of the receiver.

34. A method of delivering a functional material to a receiver comprising in order:

providing a mixture of a fluid having a solvent and a functional material, the mixture being contained under a predetermined pressure;

causing the functional material to become free of the solvent including moving the mixture from a first predetermined thermodynamic state to a second thermodynamic state; and causing the functional material to contact a receiver, wherein moving the mixture from the first predetermined thermodynamic state to the second thermodynamic state includes decreasing the predetermined pressure.

35. The method according to claim 34, wherein providing the mixture of the fluid having the solvent and the functional material includes providing a solution of the fluid having the solvent and the functional material.

36. The method according to claim 34, wherein providing the mixture of the fluid having the solvent and the functional material includes providing a dispersion of the fluid having the solvent and the functional material.

37. The method according to claim 34, wherein providing the mixture of the fluid having the solvent and the functional material includes providing a mixture of a compressed liquid and the functional material.

38. The method according to claim 34, wherein providing the mixture of the fluid having the solvent and the functional material includes providing a mixture of a supercritical fluid and the functional material.

39. The method according to claim 34, wherein moving the mixture from the first predetermined thermodynamic state to the second thermodynamic state evaporates the solvent.

40. The method according to claim 34, the receiver having a surface, the method further comprising causing the functional material to penetrate the surface of the receiver.

41. The method according to claim 34, the receiver having a plurality of layers, the method further comprising causing the functional material to penetrate and pass through a first layer of the receiver, and penetrate a second layer of the receiver such that the second layer primarily contains the functional material.

42. The method according to claim 41, further comprising selectively positioning the functional material within the second layer of the receiver.

43. The method according to claim 34, the receiver having a layer, the method further comprising selectively positioning the functional material within the layer of the receiver.

44. The method according to claim 34, the receiver having a surface, the method further comprising selectively positioning the functional material on the surface of the receiver.

45. The method according to claim 34, wherein providing the mixture of the fluid having the solvent and the functional material includes providing a thermodynamically stable mixture of the fluid having the solvent and the functional material.

46. A method of delivering a functional material to a receiver comprising in order:

providing a mixture of a fluid having a solvent and a functional material, the mixture being contained under a predetermined temperature;

causing the functional material to become free of the solvent including moving the mixture from a first predetermined thermodynamic state to a second thermodynamic state; and causing the functional material to contact a receiver, wherein moving the mixture from a first predetermined thermodynamic state to a second thermodynamic state includes decreasing the predetermined temperature.

47. The method according to claim 46, wherein providing the mixture of the fluid having the solvent and the functional material includes providing a mixture of a compressed liquid and the functional material.

48. The method according to claim 46, wherein providing the mixture of the fluid having the solvent and the functional material includes providing a mixture of a supercritical fluid and the functional material.

49. The method according to claim 46, wherein moving the mixture from the first predetermined thermodynamic state to the second thermodynamic state evaporates the solvent.

50. The method according to claim 46, the receiver having a surface, the method further comprising causing the functional material to penetrate the surface of the receiver.

51. The method according to claim 46, the receiver having a plurality of layers, the method further comprising causing the functional material to penetrate and pass through a first layer of the receiver, and penetrate a second layer of the receiver such that the second layer primarily contains the functional material.

52. The method according to claim 51, further comprising selectively positioning the functional material within the second layer of the receiver.

53. The method according to claim 46, the receiver having a layer, the method further comprising selectively positioning the functional material within the layer of the receiver.

54. The method according to claim 46, the receiver having a surface, the method further comprising selectively positioning the functional material on the surface of the receiver.

55. The method according to claim 46, wherein providing the mixture of the fluid having the solvent and the functional material includes providing a thermodynamically stable mixture of the fluid having the solvent and the functional material.

* * * * *